US012203313B2

(12) United States Patent
Dingman et al.

(10) Patent No.: US 12,203,313 B2
(45) Date of Patent: Jan. 21, 2025

(54) OVEN WITH SPLIT DOORS

(71) Applicant: TPS IP, LLC, Cleveland, OH (US)

(72) Inventors: Lyle Oscar Dingman, East Troy, WI (US); Michael Abraham Schneck, New Berlin, PA (US); Gary Allen Hanson, Janesville, WI (US); David Allen Strand, Burlington, WI (US); Michael Laddie Grande, Elkhorn, WI (US); Geoffry Allen Gromiuk, Mukwonago, WI (US); Steven Edward Kempowski, Oconomowoc, WI (US); Jon Allen Ludlum, Darien, WI (US); Zachary Alan Griffa, Milwaukee, WI (US)

(73) Assignee: TPS IP, LLC, Cleveland, OH (US)

( * ) Notice: Subject to any disclaimer, the term of this patent is extended or adjusted under 35 U.S.C. 154(b) by 490 days.

(21) Appl. No.: 17/677,652

(22) Filed: Feb. 22, 2022

(65) Prior Publication Data

US 2022/0178193 A1     Jun. 9, 2022

Related U.S. Application Data

(62) Division of application No. 15/922,569, filed on Mar. 15, 2018, now Pat. No. 11,299,925.

(Continued)

(51) Int. Cl.
*E05F 15/611*     (2015.01)
*A21B 3/02*       (2006.01)
(Continued)

(52) U.S. Cl.
CPC .............. *E05F 15/611* (2015.01); *A21B 3/02* (2013.01); *E05F 15/665* (2015.01);
(Continued)

(58) Field of Classification Search
CPC ........ A21B 3/02; E05F 15/611; E05F 15/665; E05Y 2900/308; F24C 15/023; F24C 15/028
(Continued)

(56) References Cited

U.S. PATENT DOCUMENTS 2,192,519 A   3/1940  King
2,836,498 A   5/1958  Fennema
(Continued)

FOREIGN PATENT DOCUMENTS

CN   201098013 Y   8/2008
CN   101986040 A   3/2011
(Continued)

OTHER PUBLICATIONS

Notice of Allowance received for U.S. Appl. No. 17/931,346 dated Dec. 6, 2023, 54 pages.

(Continued)

*Primary Examiner* — Vy T Nguyen
(74) *Attorney, Agent, or Firm* — Amin, Turocy & Watson, LLP

(57) ABSTRACT

A method for operating a multi-door oven apparatus is provided. In one example, the method comprises moving, by a mechanical device, a first oven door along a first path in a first direction orthogonal to a side surface of an oven, the side surface comprising an entrance to the oven. The method further comprises moving, by the mechanical device, the first oven door along a second path in a second direction parallel to the side surface, wherein moving the first oven door along the second path comprises moving the first oven door past a second oven door.

20 Claims, 12 Drawing Sheets

Related U.S. Application Data

(60) Provisional application No. 62/570,974, filed on Oct. 11, 2017.

(51) Int. Cl.
*E05F 15/665* (2015.01)
*F24C 15/02* (2006.01)

(52) U.S. Cl.
CPC .......... *F24C 15/023* (2013.01); *F24C 15/028* (2013.01); *E05Y 2900/308* (2013.01)

(58) Field of Classification Search
USPC ....... 219/394, 700, 388, 391, 395, 414, 739, 219/214, 392, 396, 403, 408, 452.13, 492, 219/685, 699, 722, 723; 126/194, 190, 126/191, 197, 273 R, 340, 192, 19 R, 24, 126/337 R, 37 R, 39 N; 312/322, 139.2, 312/140, 295, 109, 296, 304, 319.2, 324, 312/334.24, 405, 108, 110, 114, 137, 312/140.1, 228.1, 229, 236, 263, 265.1, 312/265.4, 265.5, 323, 325, 326, 330.1; 99/339, 340, 357, 443 R; 62/457.4; 110/173 R See application file for complete search history.

(56) References Cited

U.S. PATENT DOCUMENTS

| | | | |
|---|---|---|---|
| 3,127,889 | A | 4/1964 | Mills |
| 4,262,026 | A | 4/1981 | Korkmaz |
| 4,274,688 | A | 6/1981 | Zacky |
| RE31,529 | E | 3/1984 | Lowe |
| 4,509,553 | A | 4/1985 | Hahn |
| 4,512,362 | A | 4/1985 | Groeschner |
| 4,701,334 | A | 10/1987 | Durth |
| 4,708,069 | A | 11/1987 | Kidd |
| 4,712,578 | A | 12/1987 | White |
| 4,726,352 | A | 2/1988 | Radke |
| 4,726,399 | A | 2/1988 | Miller |
| 4,830,054 | A | 5/1989 | Feichtiger et al. |
| 4,913,189 | A | 4/1990 | Kline et al. |
| 5,107,897 | A | 4/1992 | Stoll |
| 5,121,513 | A | 6/1992 | Thomas et al. |
| 5,235,903 | A | 8/1993 | Tippmann |
| 5,355,868 | A | 10/1994 | Haen |
| 5,417,246 | A | 5/1995 | Perkins et al. |
| 5,657,786 | A | 8/1997 | DuRoss et al. |
| 5,927,337 | A | 7/1999 | LaMantia |
| 5,993,878 | A | 11/1999 | Tippmann |
| 6,247,773 | B1* | 6/2001 | Harigai ................. A47F 3/0434 312/139.2 |
| 6,578,600 | B1 | 6/2003 | Young, Jr. |
| 6,713,741 | B2 | 3/2004 | Miller |
| 6,766,830 | B2 | 7/2004 | Rondreux et al. |
| 7,191,800 | B2 | 3/2007 | Berner et al. |
| 7,484,527 | B2 | 2/2009 | Tamaki et al. |
| 8,047,198 | B2 | 11/2011 | Meyer et al. |
| 8,082,943 | B2 | 12/2011 | Berner et al. |
| 8,172,546 | B2 | 5/2012 | Cedrone et al. |
| 8,753,097 | B2 | 6/2014 | Cedrone et al. |
| 8,807,164 | B2 | 8/2014 | Baier et al. |
| 9,732,876 | B2 | 8/2017 | Johnson |
| 10,008,037 | B1 | 6/2018 | Worley, III et al. |
| 9,921,641 | B1 | 8/2018 | Worley, III et al. |
| 10,495,374 | B1 | 12/2019 | Hall et al. |
| 10,504,384 | B1 | 12/2019 | Drake |
| 2002/0088244 | A1 | 7/2002 | Jennings et al. |
| 2002/0088800 | A1 | 7/2002 | Miller |
| 2003/0061773 | A1 | 4/2003 | O'Leary |
| 2004/0086606 | A1 | 5/2004 | Roehr et al. |
| 2004/0123857 | A1 | 7/2004 | Viraldo |
| 2006/0289530 | A1 | 12/2006 | Cordae |
| 2007/0095413 | A1 | 5/2007 | Zhu et al. |
| 2007/0267402 | A1* | 11/2007 | Harned ................. F24C 15/026 219/408 |
| 2008/0149088 | A1 | 6/2008 | Inada et al. |
| 2008/0206420 | A1 | 8/2008 | McFadden |
| 2009/0090347 | A1 | 4/2009 | Kim et al. |
| 2009/0194090 | A1 | 8/2009 | Kim et al. |
| 2009/0236333 | A1 | 9/2009 | Ben-Shmuel et al. |
| 2010/0128755 | A1 | 5/2010 | Luckhardt et al. |
| 2010/0242370 | A1 | 9/2010 | Trulaske, Sr. |
| 2010/0296996 | A1 | 11/2010 | Ohta et al. |
| 2011/0036826 | A1 | 2/2011 | Feng et al. |
| 2011/0050872 | A1 | 3/2011 | Harbert et al. |
| 2011/0151076 | A1 | 6/2011 | Zapp Glauser |
| 2011/0266271 | A1 | 11/2011 | Boyer et al. |
| 2011/0283714 | A1 | 11/2011 | Veltrop |
| 2011/0318698 | A1 | 12/2011 | Gaur et al. |
| 2013/0092032 | A1 | 4/2013 | Cafferty et al. |
| 2014/0026762 | A1 | 1/2014 | Riefenstein |
| 2014/0097172 | A1 | 4/2014 | Kang et al. |
| 2014/0203012 | A1 | 7/2014 | Corona et al. |
| 2015/0019017 | A1 | 1/2015 | Bodine et al. |
| 2015/0118632 | A1 | 4/2015 | Liu |
| 2015/0182074 | A1 | 7/2015 | Bucher et al. |
| 2015/0201803 | A1 | 7/2015 | Veltrop |
| 2016/0140728 | A1 | 5/2016 | Aonuma et al. |
| 2016/0160880 | A1 | 6/2016 | Douglas et al. |
| 2016/0187001 | A1 | 6/2016 | Bombardieri et al. |
| 2016/0327281 | A1 | 11/2016 | Bhogal et al. |
| 2016/0345167 | A1 | 11/2016 | Li et al. |
| 2016/0356388 | A1 | 12/2016 | Inoue |
| 2016/0374501 | A1 | 12/2016 | Logan et al. |
| 2017/0205108 | A1 | 7/2017 | Petrovic et al. |
| 2017/0208652 | A1 | 7/2017 | Luckhardt et al. |
| 2017/0243515 | A1 | 8/2017 | Vengroff et al. |
| 2018/0032125 | A1 | 2/2018 | Peterson et al. |
| 2018/0062691 | A1 | 3/2018 | Barnett, Jr. |
| 2018/0073255 | A1 | 3/2018 | Jeffries |
| 2018/0100656 | A1 | 4/2018 | Deshpande |
| 2018/0101608 | A1 | 4/2018 | Thysell |
| 2018/0114372 | A1 | 4/2018 | Nagy et al. |
| 2018/0163971 | A1 | 6/2018 | Mizusaki et al. |
| 2018/0181094 | A1 | 6/2018 | Funk et al. |
| 2018/0220500 | A1 | 8/2018 | Staton et al. |
| 2018/0345485 | A1 | 12/2018 | Sinnet et al. |
| 2019/0062084 | A1 | 2/2019 | Delieutraz et al. |
| 2019/0066239 | A1 | 2/2019 | Touchette et al. |
| 2019/0121522 | A1 | 4/2019 | Davis et al. |
| 2019/0159300 | A1 | 5/2019 | Khizar et al. |
| 2019/0295330 | A1 | 9/2019 | Nagy et al. |
| 2019/0374059 | A1 | 12/2019 | Samonigg et al. |
| 2020/0005669 | A1 | 1/2020 | Thysell |

FOREIGN PATENT DOCUMENTS

| | | |
|---|---|---|
| CN | 202348357 U | 7/2012 |
| CN | 102893091 A | 1/2013 |
| CN | 202810961 U | 3/2013 |
| CN | 103148472 A | 6/2013 |
| DE | 10 2006 029 902 A1 | 1/2008 |
| GB | 996233 A | 10/1963 |
| WO | 2013/171181 A1 | 11/2013 |
| WO | 2021/095395 A1 | 5/2021 |

OTHER PUBLICATIONS

Notice of Allowance received for U.S. Appl. No. 17/931,328 dated Nov. 29, 2023, 62 pages.
Non-Final Office Action received for U.S. Appl. No. 17/658,543 dated Feb. 1, 2024, 107 pages.
Notice of Allowance received for U.S. Appl. No. 17/931,328 dated Mar. 13, 2024, 6 pages.
Notice of Allowance received for U.S. Appl. No. 17/931,346 dated Mar. 6, 2024, 6 pages.
Non-Final Office Action received for U.S. Appl. No. 17/658,550 dated Mar. 14, 2024, 159 pages.
Notice of Allowance received for U.S. Appl. No. 17/677,632 dated Mar. 4, 2024, 105 pages.

(56) References Cited

OTHER PUBLICATIONS

Notice of Allowance received for U.S. Appl. No. 15/922,445 dated Oct. 18, 2022, 48 pages.
Advisory Office Action received for U.S. Appl. No. 15/922,605 dated Dec. 20, 2021, 5 pages.
Final Office Action received for U.S. Appl. No. 15/922,445 dated Mar. 15, 2022, 51 pages.
Advisory Office Action received for U.S. Appl. No. 15/922,445 dated Jun. 10, 2022, 29 pages.
U.S. Appl. No. 15/922,569, filed Mar. 15, 2018.
Non-Final Office Action received for U.S. Appl. No. 15/922,445 dated Jun. 23, 2022, 37 pages.
Non-Final Office Action received for U.S. Appl. No. 17/931,346 dated Mar. 2, 2023, 72 pages.
Non-Final Office Action received for U.S. Appl. No. 17/931,328 dated Feb. 17, 2023, 63 pages.
Final Office Action received for U.S. Appl. No. 17/931,346 dated Sep. 21, 2023, 89 pages.
Final Office Action received for U.S. Appl. No. 17/931,328 dated Sep. 8, 2023, 83 pages.
Notice of Allowance received for U.S. Appl. No. 15/922,605 dated Oct. 13, 2022, 6 pages.
Final Office Action received for U.S. Appl. No. 17/658,543 dated Jun. 21, 2024, 118 pages.
Notice of Allowance received for U.S. Appl. No. 17/658,543 dated Sep. 13, 2024, 156 pages.
Notice of Allowance received for U.S. Appl. No. 17/658,550 dated Aug. 21, 2024, 166 pages.
Notice of Allowance received for U.S. Appl. No. 17/677,632 dated May 20, 2024, 7 pages.
Non-Final Office Action received for U.S. Appl. No. 15/922,623 dated Jul. 25, 2019, 31 pages.
Final Office Action received for U.S. Appl. No. 15/922,623 dated Dec. 16, 2019, 24 pages.
Non-Final Office Action received for U.S. Appl. No. 15/922,584 dated Mar. 2, 2020, 43 pages.
Non-Final Office Action received for U.S. Appl. No. 15/922,605 dated Apr. 3, 2020, 53 pages.
Non-Final Office Action received for U.S. Appl. No. 15/922,445 dated May 29, 2020, 45 pages.
Non-Final Office Action received for U.S. Appl. No. 15/922,569 dated Jun. 8, 2020, 36 pages.
Final Office Action received for U.S. Appl. No. 15/922,519 dated Jun. 8, 2020, 37 pages.
Notice of Allowance received for U.S. Appl. No. 15/922,584 dated Jun. 10, 2020, 50 pages.
Final Office Action received for U.S. Appl. No. 15/922,445 dated Dec. 11, 2020, 45 pages.
Final Office Action received for U.S. Appl. No. 15/922,605 dated Oct. 26, 2020, 24 pages.
Final Office Action received for U.S. Appl. No. 15/922,519 dated Nov. 30, 2020, 33 pages.
Final Office Action received for U.S. Appl. No. 15/922,569 dated Oct. 6, 2020, 34 pages.
Advisory Office Action received for U.S. Appl. No. 15/922,605 dated Jan. 25, 2021, 16 pages.
Non-Final Office Action received for U.S. Appl. No. 15/922,605 dated Feb. 19, 2021, 31 pages.
Advisory Office Action received for U.S. Appl. No. 15/922,519 dated Feb. 19, 2021, 12 pages.
Non-Final Office Action received for U.S. Appl. No. 15/922,445 dated Aug. 19, 2021, 49 pages.
Final Office Action received for U.S. Appl. No. 15/922,605 dated Aug. 18, 2021, 35 pages.
Non-Final Office Action received for U.S. Appl. No. 15/922,519 dated Aug. 6, 2021, 49 pages.
Non-Final Office Action received for U.S. Appl. No. 15/922,569 dated Jul. 23, 2021, 54 pages.
Non-Final Office Action received for U.S. Appl. No. 15/922,605 dated Jan. 13, 2022, 42 pages.
Notice of Allowance received for U.S. Appl. No. 15/922,519 dated Jan. 10, 2022, 57 pages.
Notice of Allowance received for U.S. Appl. No. 15/922,569 dated Dec. 1, 2021, 51 pages.
Notice of Allowance received for U.S. Appl. No. 17/658,543 dated Sep. 27, 2024, 6 pages.
Notice of Allowance received for U.S. Appl. No. 17/658,550 dated Oct. 1, 2024, 6 pages.

* cited by examiner

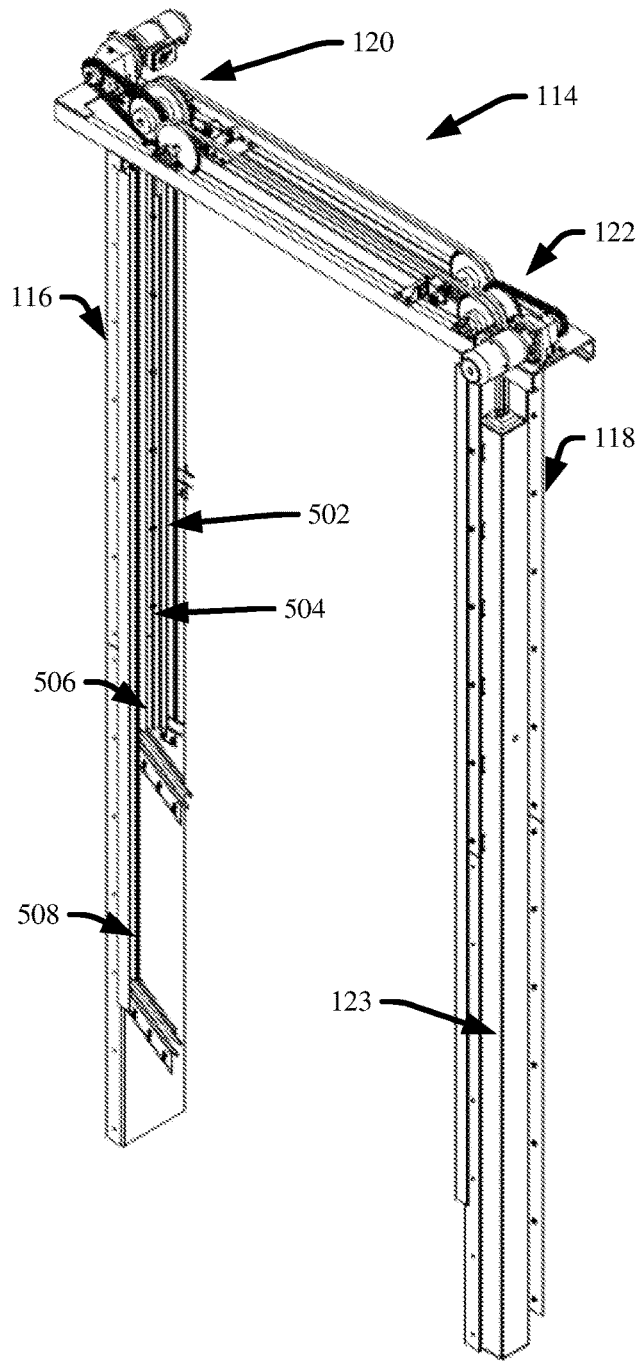
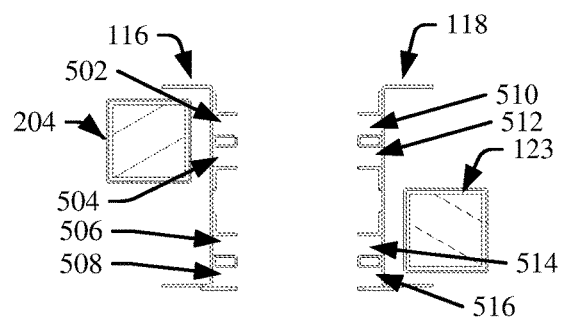
FIG. 5B
FIG. 5A

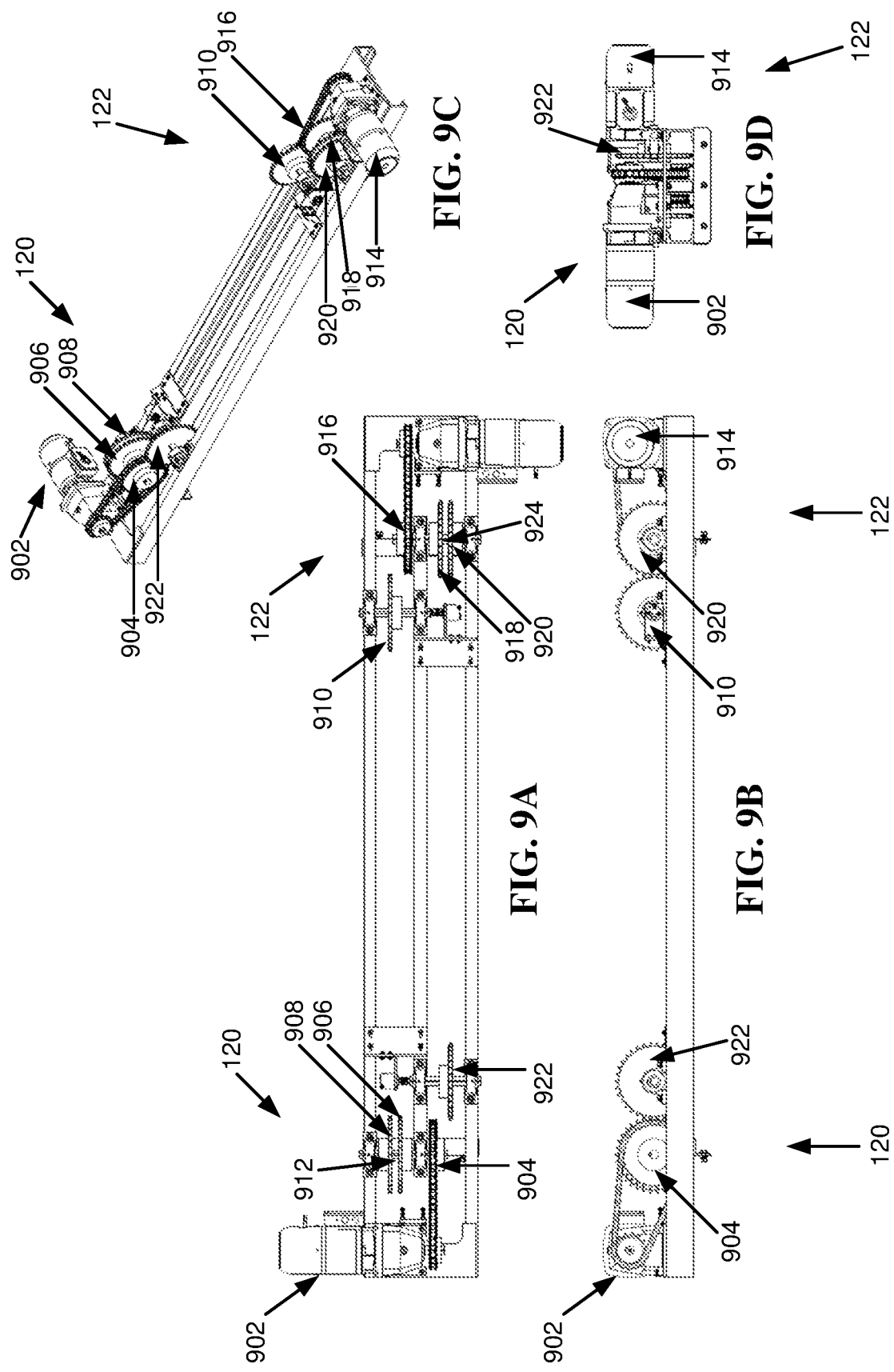

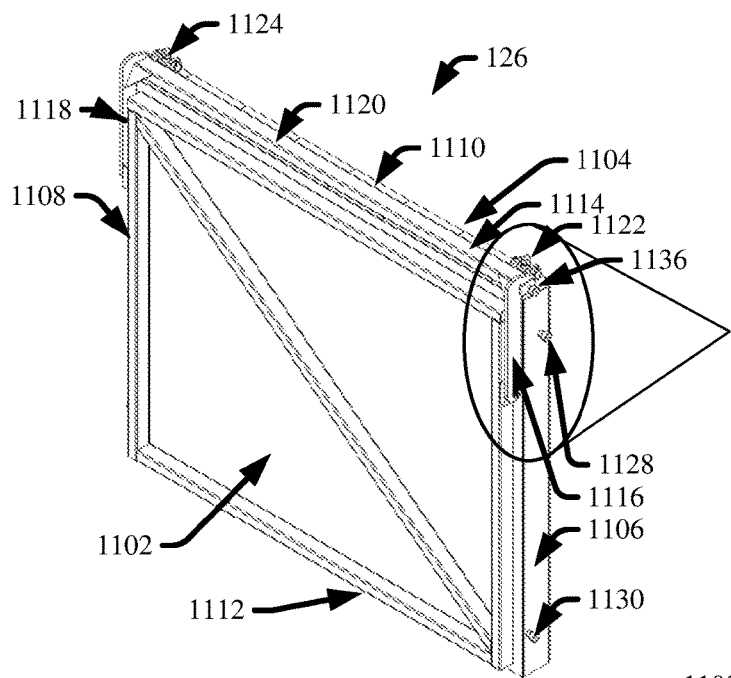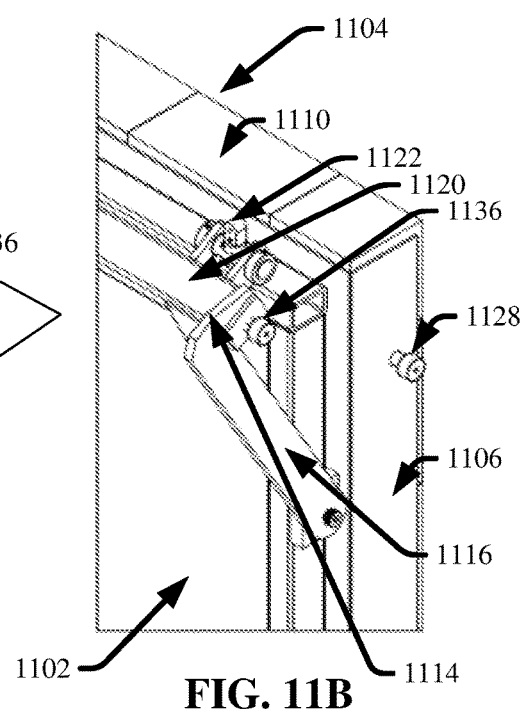
FIG. 11A
FIG. 11B
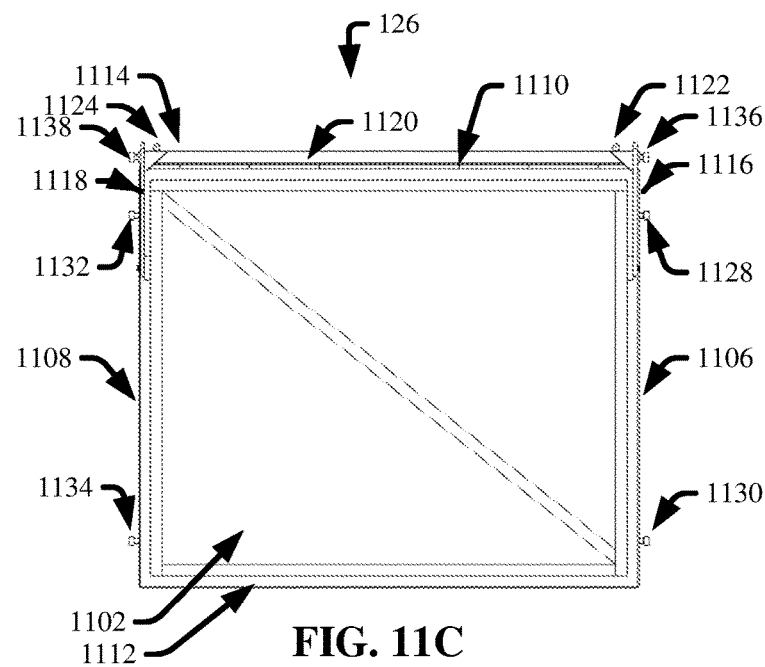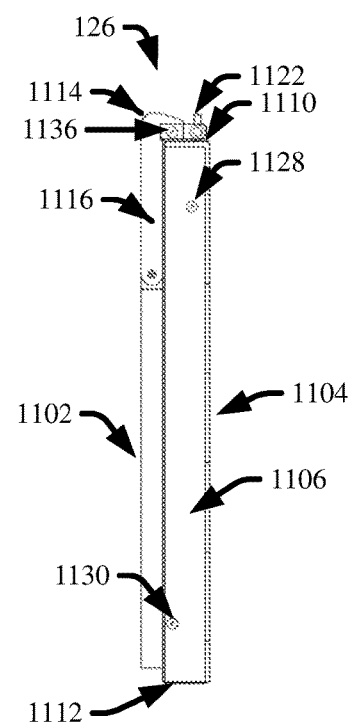
FIG. 11C
FIG. 11D

OVEN WITH SPLIT DOORS

CROSS-REFERENCE TO RELATED APPLICATIONS

This application is a continuation of, and claims priority to each of, pending U.S. patent application Ser. No. 15/922,569, filed on Mar. 15, 2018, entitled "OVEN WITH SPLIT DOORS", which claims the benefit of U.S. Provisional Patent Application Ser. No. 62/570,974 filed on Oct. 11, 2017, entitled "OVEN WITH SPLIT DOORS." The entirety of the aforementioned application is incorporated by reference herein.

TECHNICAL FIELD

The subject disclosure relates to an oven with split doors, and more specifically, to an oven with split doors that can travel in parallel to each other to improve functionality and efficiency.

BACKGROUND ART

Ovens can vary greatly in size and function, ranging from small toaster ovens to large commercial ovens. One common features amongst various size ovens is the necessity of a door to facilitate the introduction and removal of items to and from the subject oven. As ovens increase in size, as do conventional oven doors. Thus, large ovens often comprise doors that are heavy, slow to operate, and require a large amount of space to function properly. For example, oven doors that swing away from the subject oven require a space free of obstacles for the door to traverse through during opening and closing, thereby increasing the total amount of free space necessary for oven operation. In another example, ovens that comprise a door that slides vertically to achieve open and closed states require free space above the subject oven so as to not impede the opening of the door, thereby increasing the necessary height of available space necessary for oven operation.

Various embodiments described herein regard an oven that can comprise a plurality of doors, which can be operated independent of each other so as to increase the oven's efficiency and functionality. For example, by utilizing a plurality of doors instead of one door, one or more ovens described herein can comprise doors that weigh less than conventional doors for an equivalent oven, operate more quickly than conventional doors for an equivalent oven, and/or require less space for operation than conventional doors for an equivalent oven. Similarly, one or more embodiments described herein regard a method that can facilitate operation of an oven comprising a plurality of oven doors.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein apparatuses and/or methods that can facilitate operation of a split door oven are described.

According to an embodiment, an oven door operating apparatus is provided. The oven door operating apparatus can comprise a first panel comprising a first plurality of grooves that can traverse a side surface of the first panel. Also, the oven door operating apparatus can comprise a second panel comprising a second plurality of grooves that can traverse a side surface of the second panel, wherein the side surface of the first panel can face the side surface of the second panel. Further, the oven door operating apparatus can comprise an oven door positioned between the side surface of the first panel and the side surface of the second panel. The oven door can comprise a plurality of projections that extend from the oven door into the first plurality of grooves and the second plurality of grooves. Moreover, the first plurality of grooves and the second plurality of grooves can extend in a first direction and then turn to extend in a second direction.

According to another embodiment, an oven is provided. The oven can comprise an oven body that can have a hollow space defined by a plurality of sides, wherein a side of the plurality of sides can have a hole that connects the hollow space to an environment outside the oven body. The oven can also comprise an oven door operating frame adjacent to the side having the hole. The oven door operating frame can comprise a first panel comprising a first plurality of grooves that can traverse a side surface of the first panel. Also, the oven door operating frame can comprise a second panel comprising a second plurality of grooves that can traverse a side surface of the second panel, wherein the side surface of the first panel can face the side surface of the second panel. Further, the oven door operating frame can comprise an oven door positioned between the side surface of the first panel and the side surface of the second panel. The oven door can comprise a plurality of projections that extend from the oven door into the first plurality of grooves and the second plurality of grooves. Moreover, the first plurality of grooves and the second plurality of grooves can extend in a first direction and then turn to extend in a second direction.

According to another embodiment, a method for operating an oven door is provided. The method can comprise moving, by a mechanical device, the oven door along a first path in a direction orthogonal to a side surface of an oven, the side surface comprising an entrance to the oven. Further, the method can comprise moving, by the mechanical device, the oven door along a second path in a second direction parallel to the side surface, wherein moving the oven door along the second path comprises moving the oven door past a second oven door.

BRIEF DESCRIPTION OF THE DRAWINGS

FIG. 5A illustrates a diagram of an example, non-limiting lift assembly from the first perspective in accordance with one or more embodiments described herein.

FIG. 5B illustrates a diagram of an example, non-limiting first panel and second panel of a lift assembly from the fourth perspective in accordance with one or more embodiments described herein.

FIG. 9A illustrates a diagram of example, non-limiting drive assemblies from the fourth perspective in accordance with one or more embodiments described herein.

FIG. 9B illustrates another diagram of the example, non-limiting drive assemblies from the second perspective in accordance with one or more embodiments described herein.

FIG. 9C illustrates another diagram of the example, non-limiting drive assemblies from the first perspective in accordance with one or more embodiments described herein.

FIG. 9D illustrates another diagram of the example, non-limiting drive assemblies from the third perspective in accordance with one or more embodiments described herein.

FIG. 11A illustrates a diagram of an example, non-limiting second oven door from the first perspective in accordance with one or more embodiments described herein.

FIG. 11B illustrates a magnified portion of the example, non-limiting second oven door from the first perspective in accordance with one or more embodiments described herein.

FIG. 11C illustrates a diagram of an example, non-limiting second oven door from the second perspective in accordance with one or more embodiments described herein.

FIG. 11D illustrates a diagram of an example, non-limiting second oven door from the third perspective in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
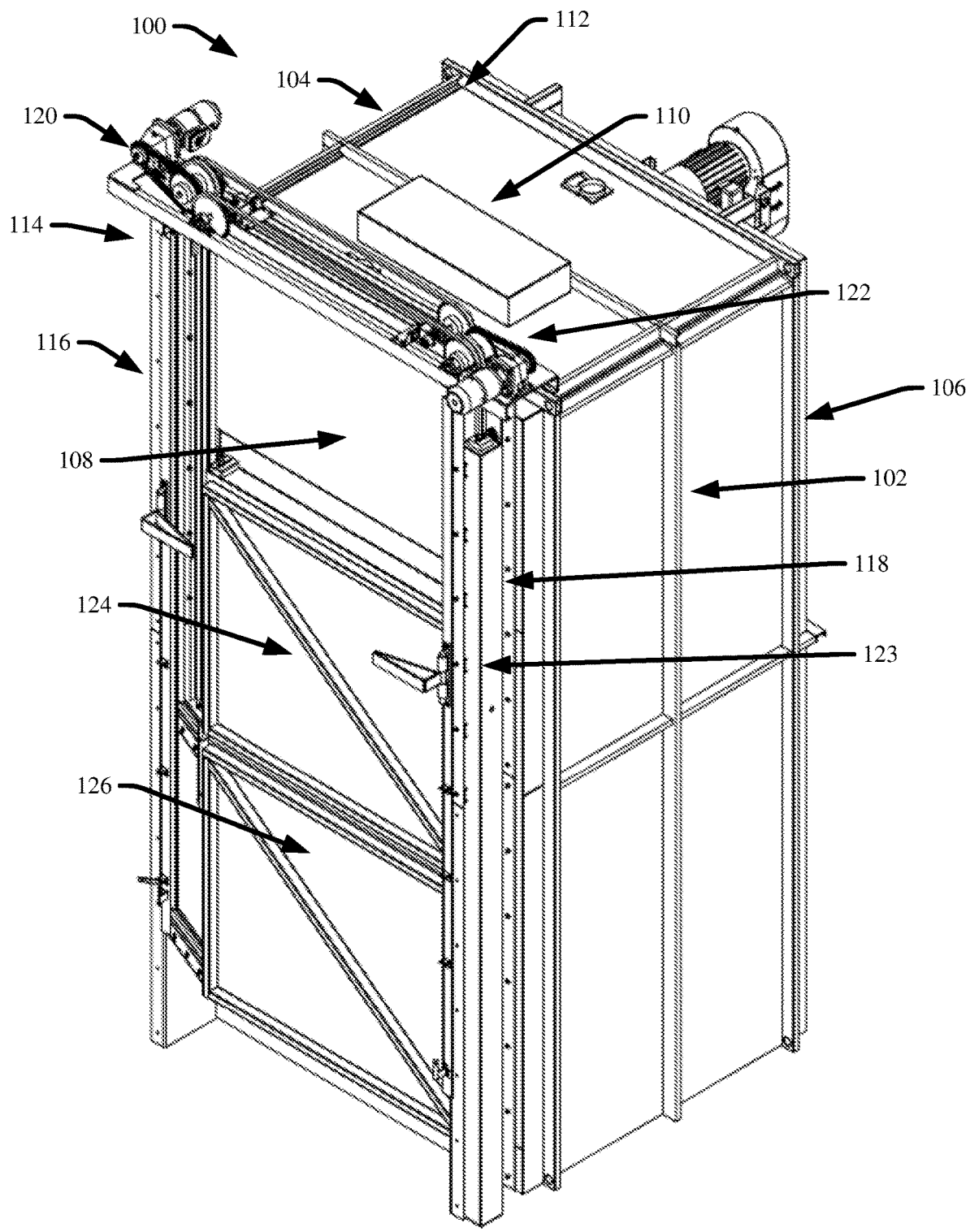
FIG. 1 illustrates a diagram of an example, non-limiting split door oven from a first perspective in accordance with one or more embodiments described herein.

FIG. 1 illustrates a diagram of an example, non-limiting oven 100 that can comprise a plurality of doors. The oven 100 can comprise a first side 102, a second side 104, a back side 106, a front side 108, and a top side 110. The first side 102, the second side 104, the back side 106, the front side 108, and the top side 110 can be connected to each other so as to form an oven body 112. The oven body 112 can define a hollow space into which an item can be placed to be baked by the oven 100.

A lift assembly 114 can be attached to the oven body 112 (e.g., via the front side 108). The lift assembly 114 can traverse the parameter of the oven body 112. For example, in various embodiments the lift assembly 114 can comprise: a first panel 116 located adjacent to the front side 108 and extending the length of the first side 102, a second panel 118 located adjacent to the front side 108 and extending the length of the second side 104, and a plurality of drive assemblies (e.g., a first drive assembly 120 and a second drive assembly 122) located adjacent to the front side 108 and extending across a length of the top side 110. In various embodiments, the second panel 118 can comprise a first counter weight tube 123 (described herein in greater detail below). In one or more embodiments, the lift assembly 114 can extend across the entire length of the oven 100 (e.g., from a bottom of the oven 100 to the top side 110). In some embodiments, the lift assembly 114 can extend across only a portion of the oven 100 (e.g., across two-thirds, one half, one quarter, or one-third of the front side 108).

The lift assembly 114 can be connected to a plurality of doors. In various embodiments, the plurality of doors can comprise a first door 124 and a second door 126. In one or more embodiments, the plurality of doors can comprise more than two doors depending on the size and function of the oven 100. The plurality of doors can comprise a number of doors ranging from greater than or equal to three doors to less than or equal to twenty doors. Operation of the plurality of doors (e.g., first door 124 and second door 126) can be controlled by the lift assembly 114, wherein each door is connected to a respective drive assembly and guided by the first panel 116 and the second panel 118. For instance, an oven 100 comprising two doors can also comprise two drive assemblies while an oven 100 comprising three doors can also comprise three drive assemblies.

For example, the first door 124 can be connected to the first drive assembly 120 and can achieve an open and/or closed position by traversing a plane dictated by the first panel 116 and the second panel 118. Also, the second door 126 can be connected to the second drive assembly 122 and can achieve an open and/or closed position by traversing a plane dictated by the first panel 116 and the second panel 118. Example instruments that can connect the plurality of doors to the plurality of drive assemblies include, but are not limited to: ropes, chains, cords, wires, a combination thereof, and/or the like.

FIG. 1 shows the oven 100 in a closed state, wherein the first door 124 and the second door 126, in conjunction, form a barrier that separates the hollow space defined by the oven body 112 from an environment surrounding the oven body 112. While in a closed state, first door 124 and the second door 126 can both be positioned adjacent to the front side 108. For example, the first door 124 can be positioned adjacent to the front side 108 and close enough to the front side 108 so as to form a seal between the first door 124 and the front side 108, wherein the seal can serve to separate an environment within the oven body 112 from the environment outside the oven body 112 (e.g., by preventing the environment within the oven body 112 from escaping through the front side 108 and around the first door 124). Similarly, the second door 126 can be positioned adjacent to the front side 108 and close enough to the front side 108 so as to form a seal between the second door 126 and the front side 108, wherein the seal can serve to separate the environment within the oven body 112 from the environment outside the oven body 112 (e.g., by preventing the environment within the oven body 112 from escaping through the front side 108 and around the second door 126). Also, a bottom portion of the first door 124 can be positioned adjacent to a top portion of the second door 126 while each door remains adjacent to the front side 108. The bottom portion of the first door 124 can be positioned close enough to the top portion of the second door 126 so as to form a seal between the first door 124 and the second door 126, wherein the seal can serve to separate the environment within the oven body 112 from the environment outside the oven body 112 (e.g., by preventing the environment within the oven body 112 from escaping around the first door 124 and/or second door 126). While the oven 100 is in a closed state, both the first door 124 and the second door 126 are positioned parallel to each other and along the same first plane. As shown in FIG. 1, while the oven 100 is in a closed state, the plurality of oven doors (e.g., the first door 124 and/or the second door 126) appear to be stacked on top of one another.

In various embodiments, the plurality of doors can comprise more than two doors. In such embodiments, doors in addition to the first door 124 and the second door 126 can also be positioned along the first plane when the oven 100 is in a closed state. For example, wherein the plurality of doors comprises three doors and the oven 100 is in a closed state, each of the three door can be positioned along the first plane such that they are adjacent to the first side 108 and adjacent to at least one other door. In other words, an oven 100 comprising three doors can appear to have the three doors stacked on top of each other along a first plane adjacent to the first side 108.

In one or more embodiments, the lift assembly 114 can be manufactured as a part of the oven body 112 during manufacturing of the oven 100. Alternatively, in some embodiments, the lift assembly 114 can be manufactured separate from the oven body 112. For example, the lift assembly 114 can be retrofitted to a previously manufactured oven body 112 to produce the oven 100. One of ordinary skill in the art will readily recognize that the oven body 112 can be manufactured to a variety of dimensions depending on the operations of the oven 100. Further, the lift assembly 114 can be manufactured to a variety of sizes depending on the dimensions of the oven body 112.

The oven body 112 can be made of materials such as, but not limited to: aluminum, aluminum alloys, steal, iron, iron alloys, brass, brass alloys, ceramic, ceramic composites, stone, glass, plastic, a combination thereof, and/or the like. The lift assembly 114 can be made of materials such as, but not limited to: aluminum, aluminum alloys, steal, iron, iron alloys, brass, brass alloys, ceramic, ceramic composites, stone, glass, plastic, a combination thereof, and/or the like. Further, while FIG. 1 illustrates the oven body 112 having a rectangular shape, other structural shapes such as squares, cylinders, and circles are also envisaged.

Figure 2:
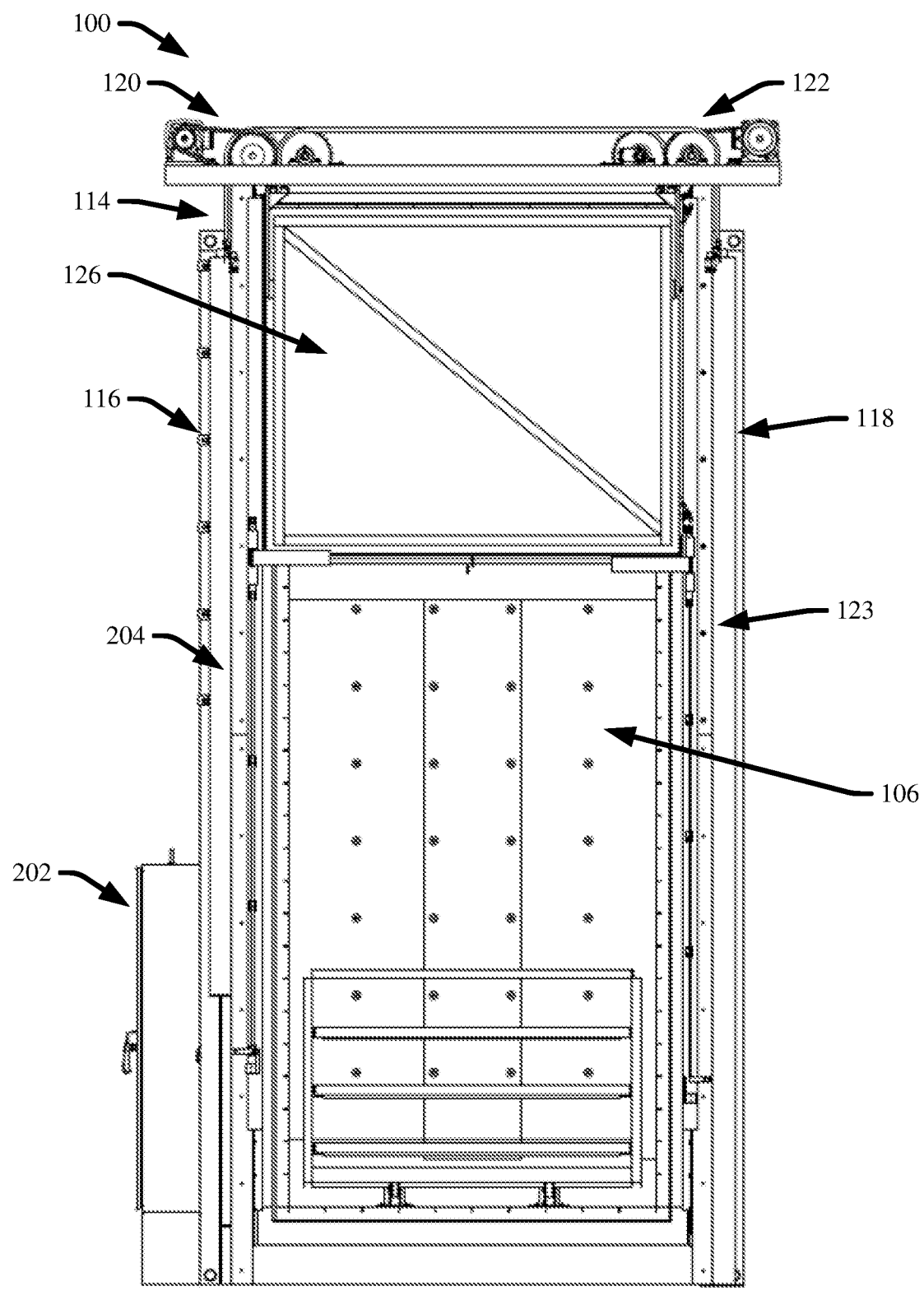
FIG. 2 illustrates another diagram of the example, non-limiting split door oven from a second perspective in accordance with one or more embodiments described herein.

FIG. 2 illustrates a diagram of the example, non-limiting oven 100 from a second perspective and in a fully open state. Repetitive description of like elements employed in other embodiments described herein is omitted for sake of brevity. As shown in FIG. 2, the hollow space defined by the oven body 112 can be accessed via a hole in the front side 108 of the oven 100. When the oven 100 is in a fully open state, the hollow space can be accessible to the environment outside the oven body 112 via the hole in the front side 108. Also, when the oven 100 is in a fully open state, the plurality of doors can be positioned so as to not block the hole in the front side 108.

In various embodiments, the oven 100 can achieve a fully opened state by moving each door in the plurality of doors. For example, the first door 124 (not visible in FIG. 2) can move to a position above the hole in the font side 108. In other words, the first door 124 can move along a path dictated by the lift assembly 114 from a first position covering at least a portion of the hole in the front side 108 when the oven 100 is in a closed state (e.g., as shown in FIG. 1) to a second position not completely covering the hole in the front side 108 when the oven 100 is in a fully open state (e.g., as shown in FIG. 2). Similarly, the second door 126 can move to a position next to, and adjacent to, the first door 124 when the oven 100 is in a fully open state. In other words, the second door 126 can move along a path dictated by the lift assembly 114 from third position covering at least a portion of the hole in the front side 108 when the oven 100 is in a closed state (e.g., as shown in FIG. 1) to a fourth position not completely covering the hole in the front side 108 when the oven 100 is in a fully open state (as shown in FIG. 2).

Thus, the oven 100 can achieve a fully open state by moving each door in the plurality of doors (e.g., the first door 124 and the second door 126) to new positions that do not impede, or substantially reduce impeding of, access to the hole in the front side 108 of the oven 100. Whereas when the oven 100 is in a closed state the plurality of doors are aligned end-to-end along the first plane, when the oven 100 is in a fully open state the plurality of doors are aligned side-to-side along a second plane that is perpendicular to the first plane.

The oven 100 can also achieve a partially open state, wherein the oven 100 moves fewer than all the doors in the plurality of doors. For example, wherein the oven 100 comprises the first door 124 and the second door 126, the first door 124 can be moved to the second position while the second door 126 remains in the third position as described herein, or the second door 126 can be moved to the fourth position while the first door 124 remains in the first position as described herein. In other words, to achieve a partially open state, the oven 100 can move less than all the available doors in the plurality of doors in order to grant partial access to the hole in the front side 108. The partial access granted by the partially open state is less than the full access granted by the fully open state.

In order to achieve a partially open state, the oven 100 can move a certain number of available doors M in accordance with the following formula: $M=D-N$. Wherein D can represent the total number of available doors in the plurality of doors, and N can represent an integer greater than zero and less than D. For example, wherein the plurality of doors comprises two doors (e.g., the first door 124 and the second door 126), the number of doors that can move M to achieve a partially open state is one (e.g., either the first door 124 or the second door 126) because the total number of available doors D is two and the only integer N greater than zero and less than two is one. In another example, wherein the plurality of doors comprises three doors, the number of doors that can be moved M to achieve a partially open state is one door or two doors because the total number of available doors D is three and there are two integers N greater than zero and less than three (i.e., the integers one and two).

In various embodiments, the oven 100 (e.g., via the lift assembly 114) can move each door of the plurality of doors comprising the oven 100 simultaneously, consecutively, and/or independently. Also, in one or more embodiments, the oven 100 (e.g., via the lift assembly 114) can move each door of the plurality of doors at the same speed. In another embodiment, the oven 100 (e.g., via the lift assembly 114) can move each door of the plurality of doors at a different speed. For example, the lift assembly 114 can move the first door 124 at a first speed and the second door 126 at a second speed. In another example, the lift assembly 114 can move both the first door 124 and the second door 126 at a first speed and move a third door at a second speed.

In one or more embodiments, operation of the lift assembly 114, and thereby movement of the plurality of doors, can be controlled by an electrical box 202. FIG. 2 shows the electrical box 202 positioned alongside the second side 104 of the oven body 112; however, other positions (e.g., alongside the first side 102 and/or alongside the back side 106) are also envisaged. The electrical box 202 can be operably coupled to one or more motors that power the plurality of drive assemblies (e.g., the first drive assembly 120 and/or the second drive assembly 122). Further, in various embodiments the first panel 116 can comprise a second counter weight tube 204 (described herein in greater detail below).

Figure 3:
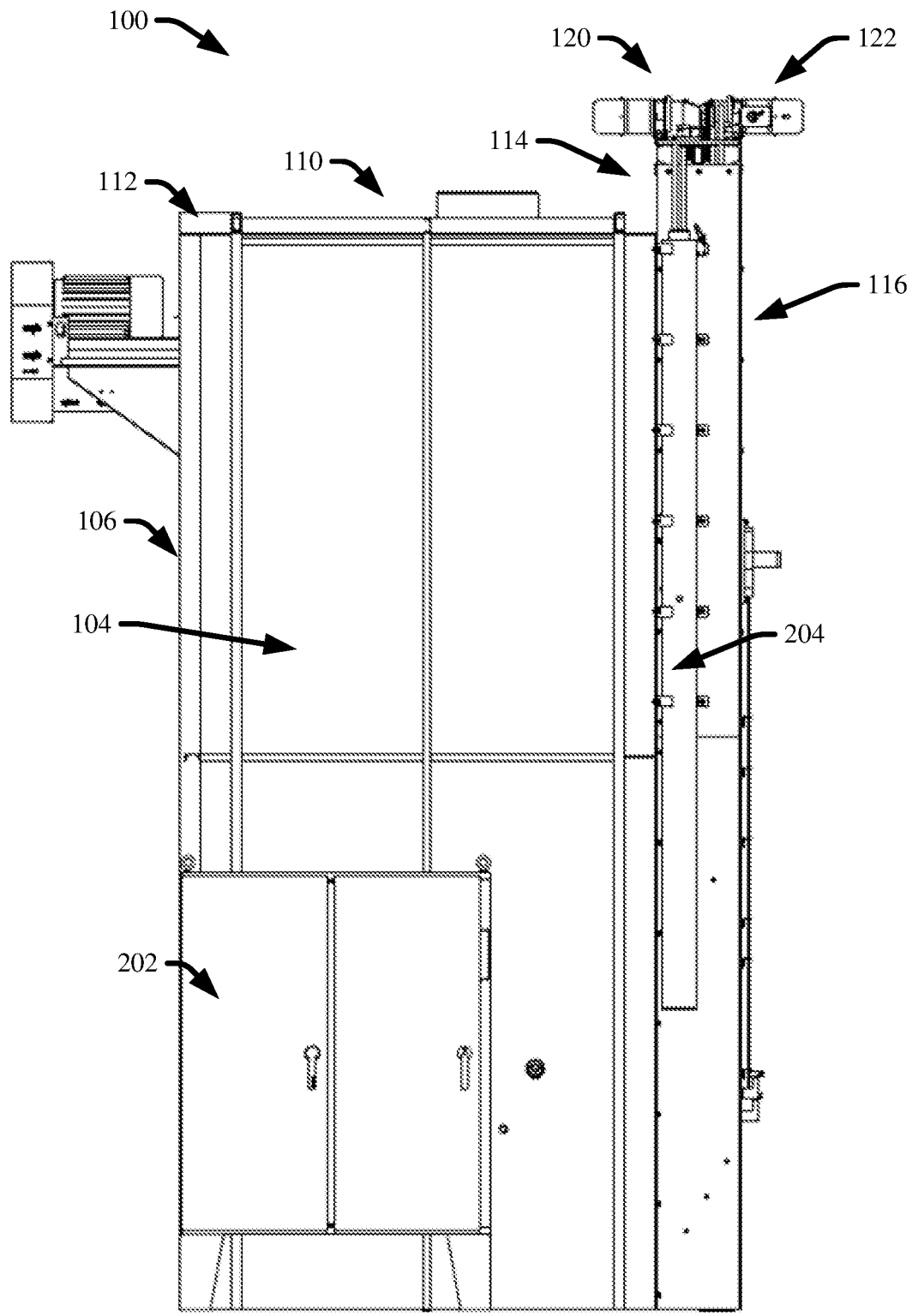
FIG. 3 illustrates another diagram of the example, non-limiting split door oven from a third perspective in accordance with one or more embodiments described herein.

FIG. 3 illustrates a diagram of the example, non-limiting oven 100 from a third perspective. Repetitive description of like elements employed in other embodiments described herein is omitted for sake of brevity. FIG. 3 shows that in various embodiments the lift assembly 114 extends past the top side 110 of the oven body 112. In other words, the first panel 116 and the second panel 118 can extend past the top side 110 such that the plurality of drive assemblies (e.g., the first drive assembly 120 and the second drive assembly 122) can be positioned above the oven body 112.

In one or more embodiments, the plurality of oven doors are lifted vertically to achieve a partially and/or fully open state. Thus, in order to ensure that each door of the plurality of doors can be lifted clear of the hole in the front side 108 of the oven 100, the plurality of drive assemblies can be positioned above the oven body 112 so as to provide adequate space between the drive assemblies and the hole in the front side 108 for the doors to be positioned into. By covering the hole in the front side 108 with a plurality of doors as oppose to a single door (e.g., as done by conventional techniques) each door can have a small height than would be required by a single door; thus, the space between hole in the front side 108 and the drive assemblies can be reduced, the plurality of drive assemblies can be positioned closer to the oven body 112, and the overall height of the oven 100 can be smaller than conventional designs. The space saving advantages of the oven 100 described herein can be achieved at least in part by the lift assembly's 114 ability to rearrange the plurality of doors from being arranged end-to-end along a first plane in a closed state to being arranged side-by-side along a second plane, which is orthogonal to the first plane, in an open state.

Figure 4:
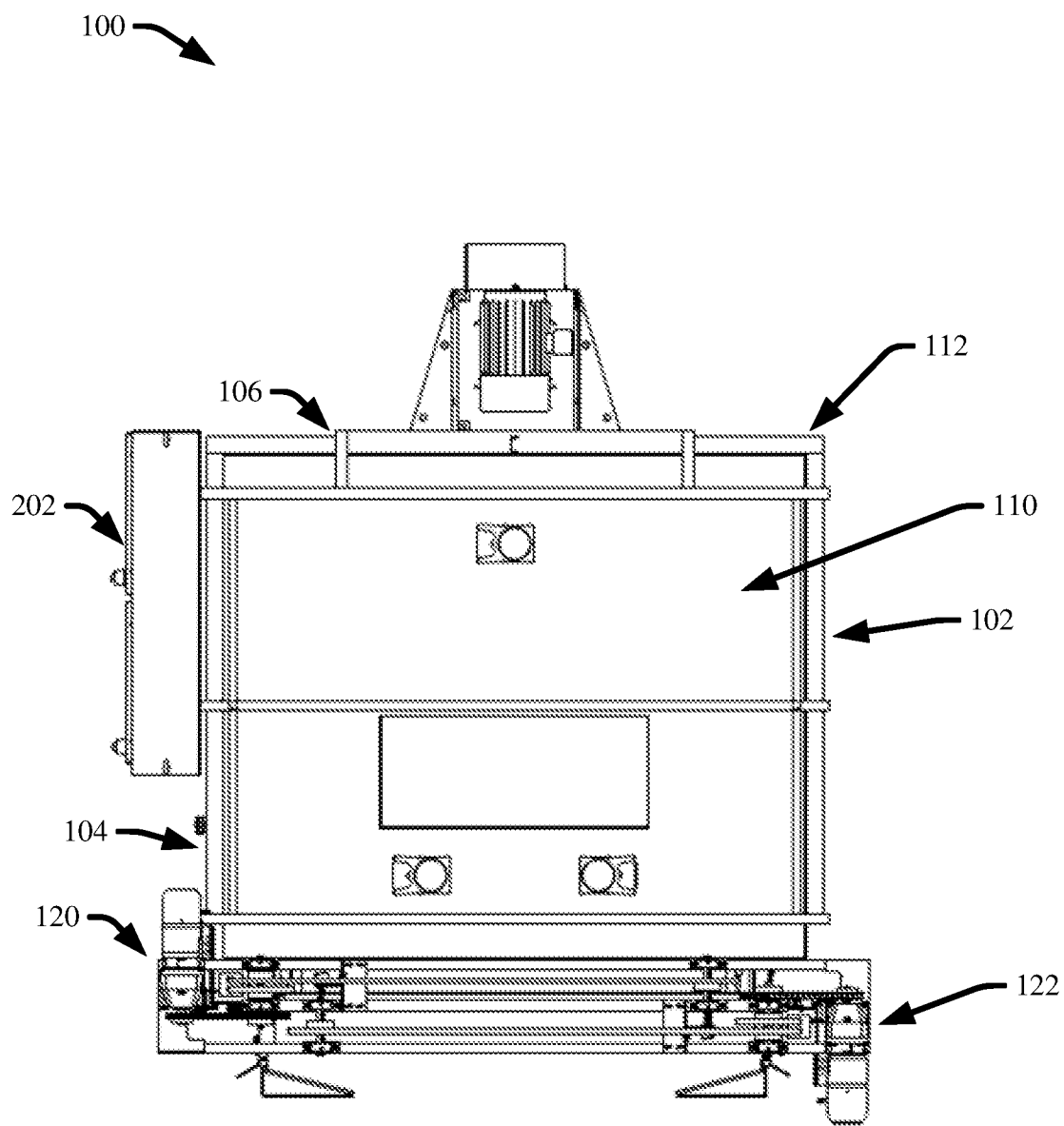
FIG. 4 illustrates another diagram of the example, non-limiting split door oven from a fourth perspective in accordance with one or more embodiments described herein.

FIG. 4 illustrates a diagram of the example, non-limiting oven 100 from a fourth perspective. Repetitive description of like elements employed in other embodiments described herein is omitted for sake of brevity. The fourth perspective provides a view looking downward onto the top of the oven 100.

FIG. 5A illustrates a diagram of an example, non-limiting lift assembly 114 from the first perspective. Repetitive description of like elements employed in other embodiments described herein is omitted for sake of brevity. In order to clearly illustrate the features of the first panel 116 and the second panel 118, FIG. 5A does not show the plurality of doors that can be positioned between the first panel 116 and the second panel 118. The first panel 116 can comprise a plurality of protrusions extending from a surface of the first panel 116 towards the second panel 118. The protrusions can form a plurality of grooves that can comprise: a first groove 502, a second groove 504, a third groove 506, and a fourth groove 508. The plurality of grooves can guide the path of the plurality of doors along the lift assembly 114 as the doors move between open and closed positions. FIG. 5A shows the first panel 116 comprising four grooves; however, additional grooves in excess of the four illustrated grooves are also envisaged. As the number of doors comprising the plurality of doors increases so too can the number of grooves comprising the first panel 116.

In various embodiments, the first panel 116 can comprise two grooves for each door of the plurality of doors. For example, the first door 124 can utilize the first groove 502 and the second groove 504 while the second door 126 can utilize the third groove 506 and the fourth groove 508. In another example, wherein the oven 100 comprises an additional third door, the first panel 116 can comprise a fifth groove 510 and a sixth groove 512 to guide the path of the third door.

FIG. 5B illustrates a diagram of the example, non-limiting first panel 116 and second panel 118 from the same fourth perspective shown in FIG. 4. Repetitive description of like elements employed in other embodiments described herein is omitted for sake of brevity. FIG. 5B illustrates the first panel 116 and the second panel 118 from the perspective of viewing down on the features. In order to clearly illustrate the features of the first panel 116 and the second panel 118, FIG. 5B does not show the plurality of doors that can be positioned between the first panel 116 and the second panel 118.

FIG. 5B shows that the second panel 118 can mirror the protrusions extending from the first panel 116. In various embodiments, the second panel 118 can comprise a plurality of protrusions extending from the surface of the second panel 118 towards the first panel 116. The protrusions on the second panel 118 can correspond to the protrusions on the first panel 116 to form a plurality of grooves on the second panel 118 that correspond to the plurality of grooves on the first panel 116. The plurality of grooves on the second panel 118 can comprise: a fifth groove 510, a sixth groove 512, a seventh groove 514, and an eighth groove 516. FIG. 5B shows the second panel 118 comprising four grooves; however, additional grooves in excess of the four illustrated grooves are also envisaged. As the number of doors comprising the plurality of doors increases so too can the number of grooves comprising the second panel 118.

In various embodiments, the second panel 118 can comprise two grooves for each door of the plurality of doors. For example, the first groove 502 and the second groove 504 can work in conjunction with the fifth groove 510 and the sixth groove 512 to guide the first door 124. Also, the third groove 506 and the fourth groove 508 can work in conjunction with the seventh groove 514 and the eighth groove 516 to guide the second door 126. In another example, wherein the oven 100 comprises a third door, the second panel 118 can comprise six total grooves in positions corresponding to six total grooves in the first panel 116.

FIG. 5B also shows the relative positioning of the first counter weight tube 123 and the second counter weight tube 204. In various embodiments, the second counter weight tube 204 can be positioned alongside the first panel 116 and near the oven body 112, whereas the first counter weight tube 123 can be positioned alongside the second panel 118 and further from the oven body 112 that the second counter weight tube 204. Thus, the first counter weight tube 123 and the second counter weight tube 204 can be arranged such that the tubes do not align with each other. The offset arrangement of the first counter weight tube 123 and the second counter weight tube 204 can be dictated by the arrangement of the first drive assembly 120 and the second drive assembly 122.

Figure 6:
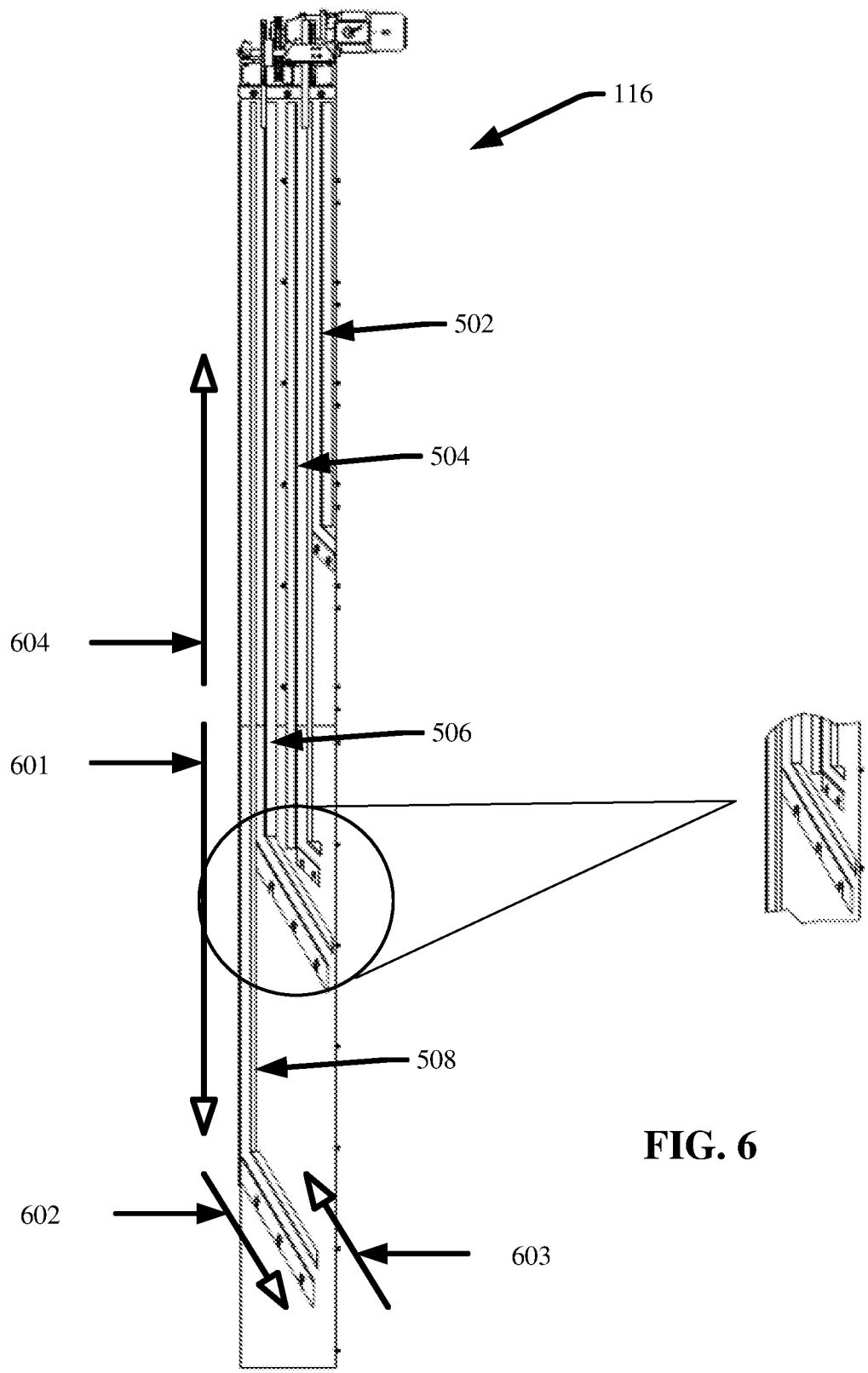
FIG. 6 illustrates another diagram of the example, non-limiting first panel of a lift assembly with a magnified portion in accordance with one or more embodiments described herein.

FIG. 6 illustrates a diagram of the example, non-limiting first panel 116. Repetitive description of like elements employed in other embodiments described herein is omitted for sake of brevity. FIG. 6 shows that the first groove 502 and the second groove 504 extend from the top of the first panel 116, near the first drive assembly 120, towards the bottom of the first panel 116. Also, the first groove 502 and the second groove 504 traverse only a portion of the first panel 116 without reaching the bottom of the first panel 116. FIG. 6 additionally shows that the grooves extend in a first direction 601, and then turn in a second direction 602. Shown for additional clarity is a third direction 603 opposite to the second direction 602 and a fourth direction 604 opposite to the first direction 601. In various embodiments, the first groove 502 and the second groove 504 only traverse the portion of the first panel 116 that guides the movement of the first door 124. For example, in one or more embodiments only the top half of the first panel 116 can guide the movement of the first door 124 because the first door 124 reaches its closed position half way down the first panel 116 and its open position at the top of the first panel 116; thus, the first groove 502 and the second groove 504 only traverses the top half of the first panel 116.

The length to which the first groove 502 and the second groove 504 extend down the first panel 116 can depend on the height of the plurality of doors, the number of doors comprising the plurality of doors, and/or the size of the hole in the front side 108. For example, as the number of doors increases, the percentage of the hole that each door covers can decrease, and thereby the overall length of the first groove 502 and the second groove 504 can decrease (e.g., the first groove 502 and the second groove 504 could extend a quarter of the length of the first panel 116). In various embodiments, the length of the first groove 502 and the second groove 504 is equivalent to the distance between a point A and a point B, wherein point A is the position of the top of the first door 124 when the first door 124 is in an open position and point B is the bottom of the first door 124 when the first door 124 is in a closed position. Also, the fifth groove 510 and the sixth groove 512 can mirror the first groove 502 and the second groove 504 on the second panel 118.

FIG. 6 also shows that the third groove 506 and the fourth groove 508 can extend down the first panel 116, from near the first drive assembly 120, past the first groove 502 and the second groove 504. Further, the fourth groove 508 can be longer than the third groove 506. The third groove 506 and the fourth groove 508 can both change direction from a first direction running parallel to the oven body 112 to a second direction running orthogonal to the oven body 112. For example, FIG. 6 provides a magnified view of the third groove's 506 change in direction. In various embodiments, each of the four grooves in the first panel 116 can run parallel with each other down the first panel 116 until the third groove 506 and the fourth groove 508 change direction. Also, the third groove 506 and the fourth groove 508 can change direction towards the oven body 112. Further, the seventh groove 514 and the eighth groove 516 can mirror the third groove 506 and the fourth groove 508 in the second panel 118.

The third groove 506 and the fourth groove 508 can guide the movement of the second door 126. Whereas the first groove 502 and the second groove 504 can guide the first door 124 along a first plane; the third groove 506 and the fourth groove 508 can guide the second door 126 between the first plane and a second plane. For example, when the oven 100 is changing from a fully open state to a closed state, the first groove 502, the second groove 504, the fifth groove 510, and the sixth groove 512 can serve to guide the first door 124 from the second position (as described above) at the top of the lift assembly 114 straight down to the first position covering a portion of the hole in the front side 108. Also, when the oven 100 is changing from a fully open state to a closed state, the third groove 506, the fourth groove 508, the seventh groove 514, and the eighth groove 516 can serve to guide the second door 126 from the fourth position at the top of the lift assembly 114, and further from the oven body 112 than the second position, down the lift assembly 114 past the first position and then towards the oven body 112 to the third position (as described above) covering a portion of the hole in the front side 108. Thereby, the third groove 506, the fourth groove 508, the seventh groove 514, and the eighth groove 516 can be configured to guide the second door 126 around the first door 124 when transitioning the oven 100 between open and closed states.

In various embodiments, the oven 100 can comprise more than two doors, in which the first panel 116 and the second panel 118 can comprise additional grooves, and said additional grooves can extend further in both the first and second directions than the third groove 506, the fourth groove 508, the seventh groove 514, and the eighth groove 516. For example, wherein the oven 100 comprises three doors, the additional grooves can guide the third door around both the second door 126 and the first door 124 when transitioning the oven 100 between open and closed states.

Figure 7:
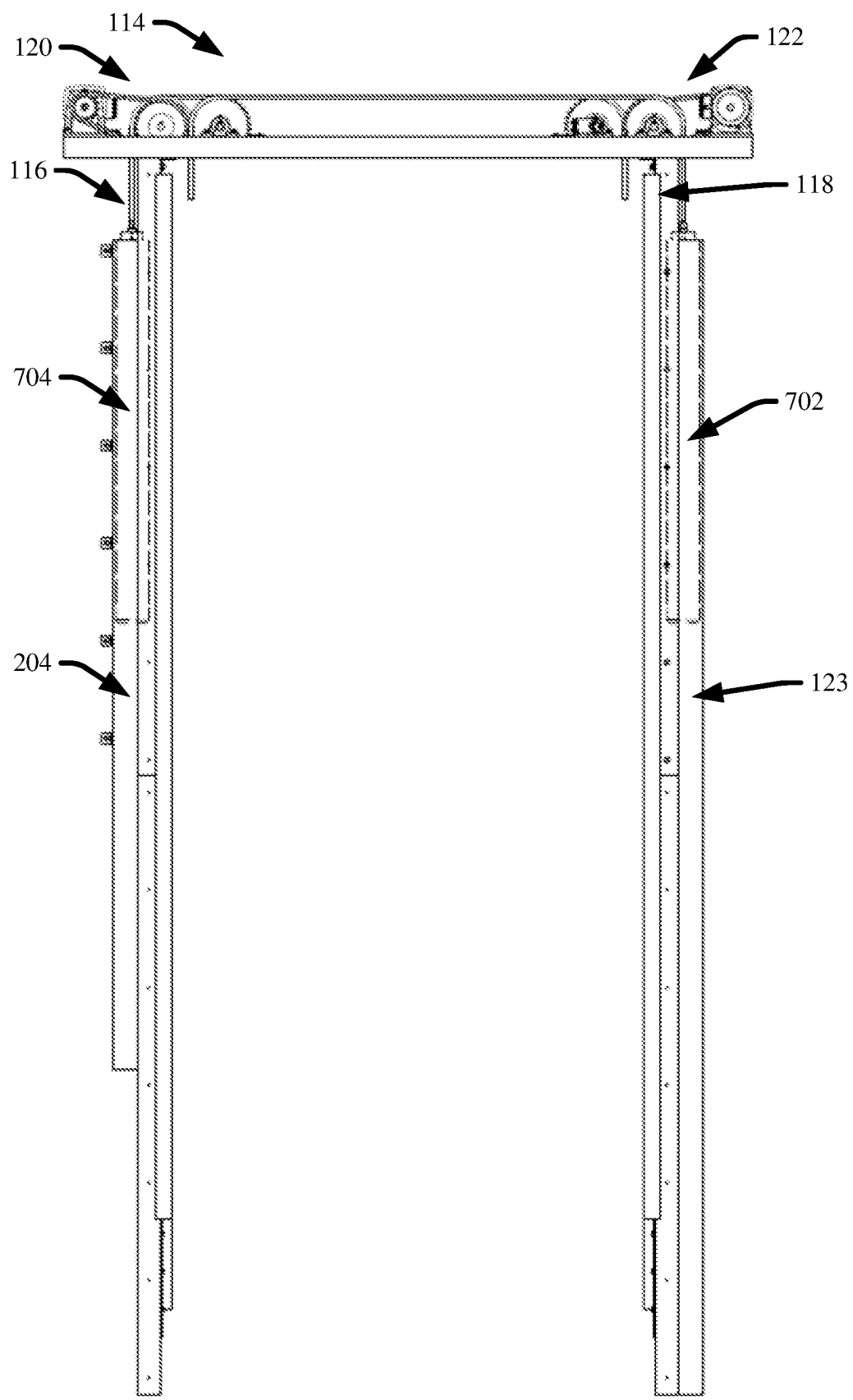
FIG. 7 illustrates another diagram of the example, non-limiting lift assembly from the second perspective in accordance with one or more embodiments described herein.

FIG. 7 illustrates a diagram of the example, non-limiting lift assembly 114 from the second perspective. Repetitive description of like elements employed in other embodiments described herein is omitted for sake of brevity. FIG. 7 illustrates a first counter weight 702 and a second counter weight 704 with dashed lines. The dashed lines indicate that the first counter weight 702 and the second counter weight 704 would normally be hidden from view because they reside in the first counter weight tube 123 and the second counter weight tube 204.

In one or more embodiments, the first counter weight tube 123 can extend to the bottom of the lift assembly 114 while the second counter weight tube 204 can extend alongside just a portion of the first panel 116. In various embodiments, the lift assembly 114 can comprise more than two counter weight tubes. For example, the lift assembly 114 can comprise an equivalent number of counter weight tubes and doors.

Figure 8:
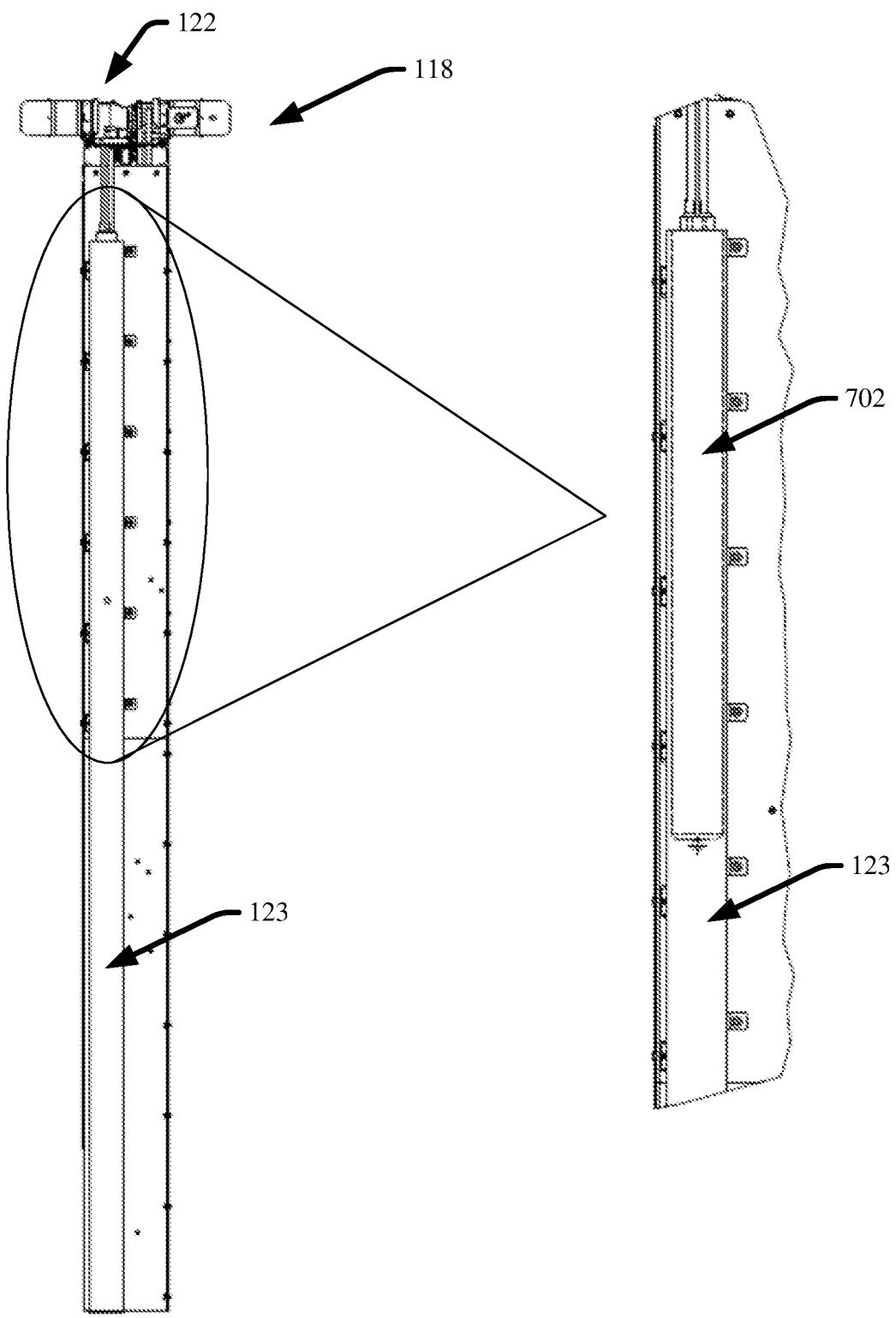
FIG. 8 illustrates a diagram of an example, a non-limiting second panel of a lift assembly with a magnified portion in accordance with one or more embodiments described herein.

FIG. 8 illustrates a diagram of the example, non-limiting second panel 118 from a side view. Repetitive description of like elements employed in other embodiments described herein is omitted for sake of brevity. FIG. 8 shows a magnified portion of the second panel 118 including the first counter weight tube 123 and the first counter weight 702. The first counter weight 702 is illustrated with dashed lines to indicate that the first counter weight 702 can normally be hidden from view by the first counter weight tube 123.

The first counter weight 702 can be connected to the second drive assembly 122 via one or more connecters. Similarly, the second counter weight 704 can be connected to the first drive assembly 120 via one or more connectors. The connecters can include, but are not limited to: wires, ropes, cords, chains, a combination thereof, and/or the like. In various embodiments, the first counter weight 702 can move along the length of the first counter weight tube 123 to facilitate moving the second door 126, and the second counter weight 704 can move along the length of the second counter weight tube 204 to facilitate moving the first door 124.

FIGS. 7 and 8 illustrate the first counter weight 702 and the second counter weight 704 as having a cylindrical shape, however other structural shapes (e.g., square shapes, circular shapes, rectangular shapes, cone shapes, and/or the like) are also envisaged. Also, while the first counter weight tube 123 and the second counter weight tube 204 are depicted as having a hollow rectangular shape, other structural shapes (e.g., square shapes, circular shapes, rectangular shapes, cone shapes, and/or the like) are also envisaged depending on the structural shape of the first counter weight 702 and the second counter weight 704. Further, the oven 100 can comprise additional counter weights depending on the number of doors in the plurality of doors.

The first counter weight 702 can be connected to the second door 126 via the second drive assembly 122 and the one or more connectors. The second counter weight 704 can be connected to the first door 124 via the first drive assembly 120 and the one or more connectors. The distance each counter weight (e.g., first counter weight 702 and/or second counter weight 704) travels, and thereby the length of each counter weight tube (e.g., first counter weight tube 123 and second counter weight tube 204), can depend on the distance each door (e.g., first door 124 and second door 126) travels along the lift assembly 114 between open and closed positions.

In various embodiments, the first counter weight 702 and the second counter weight 704 can comprise the same material and/or have the same weight. In one or more embodiments, the first counter weight 702 and the second counter weight 704 can comprise different materials and/or have different weights. Example materials comprising the first counter weight 702 and/or the second counter weight 704 can include, but are not limited to: aluminum, steel, iron, tungsten, stone, cement, a ceramic composite, a metal, a metal alloy, a combination thereof, and/or the like. The weight of the first counter weight 702 and/or the second counter weight 704 can depend on the weight of the first door 124 and/or the weight of the second door 126. For example, the weight of the counter weights with regard to a respective door associated with a counter weight via a drive assembly (e.g., the weight of the first counter weight 702 with respect to the weight of the second door 126 and/or the weight of the second counter weight 704 with respect to the weight of the first door 124) can range from about 50 percent of the weight of the door to about 300 percent of the weight of the door. In various embodiments, the lift assembly 114 can comprise more than two counter weights. For example, the lift assembly 114 can comprise an equivalent number of counter weights and doors.

FIGS. 9A-9D illustrate diagrams of the example, non-limiting first drive assembly 120 and second drive assembly 122 from multiple perspectives. Repetitive description of like elements employed in other embodiments described herein is omitted for sake of brevity. In order to illustrate the features of the plurality of drive assemblies with greater clarity, the one or more connectors connecting the first drive assembly 120 and/or the second drive assembly 122 to the first door 124, the second door 126, the first counter weight 702, and/or the second counter weight 704 are not shown; however, said one or more connectors interact with the plurality of drive assemblies via the plurality of gears comprising each drive assembly.

In various embodiments, the plurality of drive assemblies can comprise two drive assemblies (e.g., the first drive assembly 120 and the second drive assembly 122). The first drive assembly 120 can comprise a first motor 902, a first gear 904, a second gear 906, a third gear 908, and a fourth gear 910. The first motor 902 can drive the first gear 904, the second gear 906, the third gear 908, and the fourth gear 910 to move the first door 124 between multiple positions to achieve open and/or closed states. For example, the first motor 902 can directly drive the first gear 904 via a connector (e.g., a chain). The first gear 904 can be connected to the second gear 906 and the third gear 908 via a first shaft 912. As the first motor 902 rotates the first gear 904, the first gear 904 can rotate the first shaft 912. The first shaft 912 can be connected to the second gear 906 and the third gear 908. Thus, rotation of the first shaft 912 can cause the second gear 906 and the third gear 908 to also rotate. The second gear 906 can be connected, via one or more connectors, to one side of the first door 124 (e.g., the left side of the first door 124). As the second gear 906 rotates, the side of the first door 124 can move towards or away from the second gear 906. The third gear 908 can be connected to the fourth gear 910 via one or more connectors (e.g., a chain). Rotation of the third gear 908 can cause the fourth gear 910 to rotate. The fourth gear 910 can be connected, via one or more connectors, to another side of the first door 124 (e.g., the right side of the first door 124). As the fourth gear 910 rotates, the other side of the first door 124 can move towards or away from the fourth gear 910.

The second drive assembly 122 can comprise a second motor 914, a fifth gear 916, a sixth gear 918, a seventh gear 920, and an eighth gear 922. The second motor 914 can drive the fifth gear 916, the sixth gear 918, the seventh gear 920, and the eighth gear 922 to move the second door 126 between multiple positions to achieve open and/or closed states. For example, the second motor 914 can directly drive the fifth gear 916 via a connector (e.g., a chain). The fifth gear 916 can be connected to the sixth gear 918 and the seventh gear 920 via a second shaft 924. As the second motor 914 rotates the fifth gear 916, the fifth gear 916 can rotate the second shaft 924. The second shaft 924 can be connected to the sixth gear 918 and the seventh gear 920. Thus, rotation of the second shaft 924 can cause the sixth gear 918 and the seventh gear 920 to also rotate. The sixth gear 918 can be connected, via one or more connectors, to one side of the second door 126 (e.g., the left side of the second door 126). As the sixth gear 918 rotates, the side of the second door 126 can move towards or away from the sixth gear 918. The seventh gear 920 can be connected to the eighth gear 922 via one or more connectors (e.g., a chain). Rotation of the seventh gear 920 can cause the eighth gear 922 to rotate. The eighth gear 922 can be connected, via one or more connectors, to another side of the second door 126 (e.g., the right side of the second door 126). As the eighth gear 922 rotates, the other side of the second door 126 can move towards or away from the eighth gear 922.

In various embodiments, the second gear 906 and the third gear 908 can also be connected, via one or more connectors, to the second counter weight 704. Also, the sixth gear 918 and the seventh gear 920 can be connected, via one or more connectors, to the first counter weight 702. The first motor 902 and the second motor 914 can have the same designs or different designs. Further, the type and/or power of the first motor 902 and the second motor 914 can vary depending on the weight of the plurality of doors and/or the desired speed at which the plurality of doors move between open and closed positions. For example, the first motor 902 and the second motor 914 can comprise a type of motor that generates 2-5 horsepower. In one or more embodiments, each drive assembly of the plurality of drive assemblies (e.g., the first drive assembly 120 and the second drive assembly 122) can be operably connected to the electrical box 202. The electrical box 202 can enable a user of the oven 100 to control the motors comprising the plurality of drive assemblies (e.g., the first motor 902 and/or the second motor 914), thereby controlling movement of the plurality of doors (e.g., the first door 124 and/or the second door 126). In one or more embodiments, one or more of the motors (e.g., the first motor 902 and/or the second motor 914) can be connected to a hand-crank to facilitate manual operation of the motor, and thereby manual operation of the gears.

In one or more embodiments, the number of drive assemblies comprising the plurality of drive assemblies can be equivalent to the number of doors comprising the plurality of doors. For example, wherein the oven 100 comprises three doors the lift assembly 114 can comprise three drive assemblies, wherein the third drive assembly can have an equivalent structure to the first drive assembly 120 and the second drive assembly 122 shown in FIGS. 9A-D. In other words, each drive assembly in the plurality of drive assemblies can move a respective door of the plurality of doors (e.g., facilitated by a third counter weight) to achieve open and/or closed states.

Figure 10A:
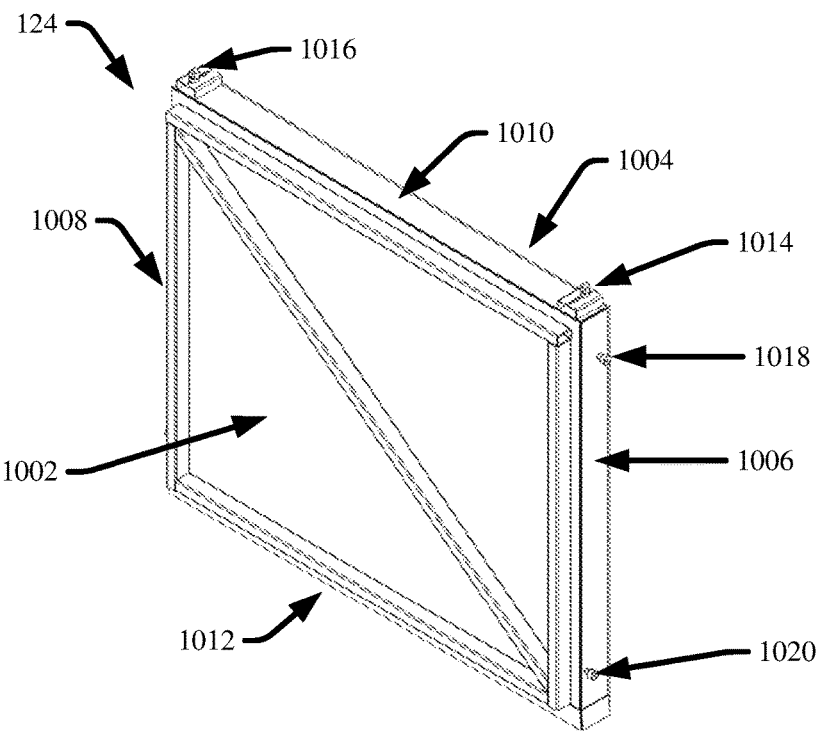
FIG. 10A illustrates a diagram of an example, non-limiting first oven door from the first perspective in accordance with one or more embodiments described herein.
Figure 10B:
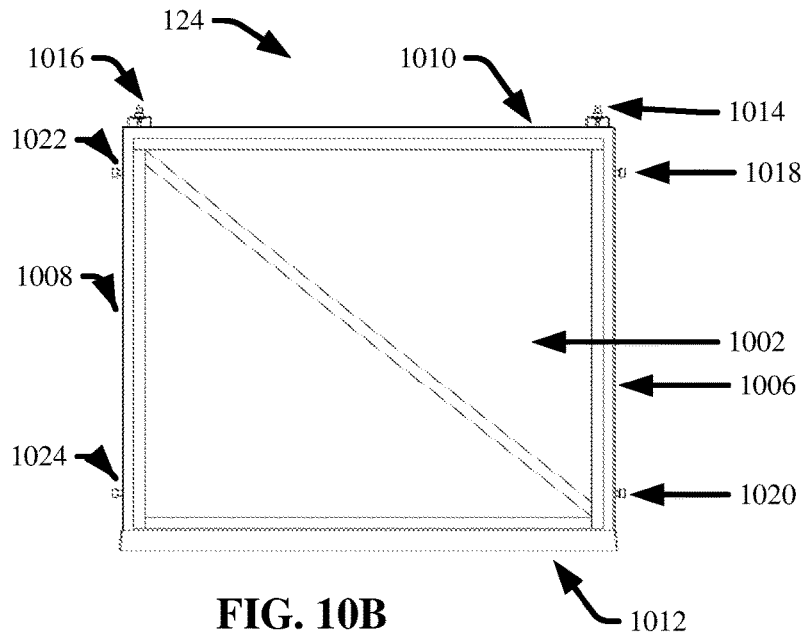
FIG. 10B illustrates another diagram of the example, non-limiting first oven door from the second perspective in accordance with the one or more embodiments described herein.
Figure 10C:
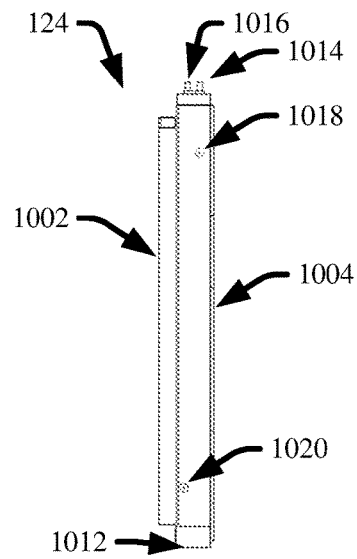
FIG. 10C illustrates another diagram of the example, non-limiting first oven door from a fifth perspective in accordance with the one or more embodiments described herein.

FIG. 10 illustrates a diagram on the example, non-limiting first door 124 from multiple perspectives. FIG. 10A illustrates the first door 124 from the first perspective utilized in FIG. 1. FIG. 10B illustrates the first door 124 from the second perspective utilized in FIG. 2. FIG. 10C illustrates the first door 124 from a fifth perspective, wherein the fifth perspective is opposite the third perspective utilized in FIG. 3. Repetitive description of like elements employed in other embodiments described herein is omitted for sake of brevity.

The first door 124 can comprise a first front surface 1002, a first back surface 1004, a first side surface 1006, a second side surface 1008, a first top surface 1010, and a first bottom surface 112. When the first door 124 is positioned in the lift assembly 114, between the first panel 116 and the second panel 118, the first front surface 1002 can face away from the oven body 112. Also, when the first door 124 is positioned in the lift assembly 114, between the first panel 116 and the second panel 118, the first back surface 1004 can face towards the oven body 112.

The first top surface 1010 can comprise a plurality of connection tabs. For example, the first top surface 1010 can comprise a first connection tab 1014 near the first side surface 1006, and a second connection tab 1016 near the second side surface 1008. The plurality of connection tabs can be connected to the plurality of drive assemblies via one or more connectors. For example, the first connection tab 1014 can be connected (e.g., via a chain) to the fourth gear 910 of the first drive assembly 120. Further, the second connection tab 1016 can be connected (e.g., via a chain) to the second gear 906 of the first drive assembly 120. In various embodiments, the first connection tab 1014 can also be positioned near the first back surface 1004 in order to align with the position of the fourth gear 910. Also, the second connection tab 1016 can further be positioned near the first front surface 1002 in order to align with the position of the second gear 906.

The first side surface 1006 and the second side surface 1008 can comprise a plurality of guidance projections to guide the movement of the first door 124 along the lift assembly 114. The plurality of guidance projections can extend from the first side surface 1006 and/or the second side surface 1008 away from the first door 124. In various embodiments, the first side surface 1006 can comprise a first guidance projection 1018 and a second guidance projection 1020. The second side surface 1008 can comprise a third guidance projection 1022 and a fourth guidance projection 1024. The plurality of guidance projections can be positioned so as to align with the plurality of grooves comprising the first panel 116 and/or the second panel 118. Further, the each guidance projection of the plurality of guidance projections can be shaped so as to fit inside a respective groove of the plurality of grooves.

For example, the first guidance projection 1018 can be positioned near the first top surface 1010 and first back surface 1004 so as to align with the fifth groove 510, located in the second panel 118, when the first door 124 is positioned in the lift assembly 114. Similarly, the third guidance projection 1022 can be positioned near the first top surface 1010 and the first back surface 1004 so as to align with the first groove 502, located in the first panel 116, when the first door 124 is positioned in the lift assembly 114. Also, the second guidance projection 1020 can be positioned near the first bottom surface 1012 and the first front surface 1002 so as to align with the sixth groove 512, located in the second panel 118, when the first door 124 is positioned in the lift assembly 114. Similarly, the fourth guidance projection 1024 can be positioned near the first bottom surface 1012 and the first front surface 1002 so as to align with the second groove 504, located in the first panel 116, when the first door 124 is position in the lift assembly 114.

The dimensions of the first door 124 can vary depending on the number of doors comprising the plurality of doors and/or the size of the hole in the front side 108. For example, the height of the first door 124 can range from, but not limited to, greater than or equal 10 inches and less than or equal to 10 feet. The width of the first door 124 can range from, but not limited to, greater than or equal 10 inches and less than or equal to 10 feet. The depth of the first door 124 can range from, but not limited to, greater than or equal 0.5 inches and less than or equal 36 inches. The weight of the first door 124 can range from, but not limited to, greater than or equal to 10 pounds and less than or equal to 2,000 pounds. In some embodiments, the first door 124 can be made from the same materials as the oven body 112. In one or more embodiments, the first door 124 can be made from different materials than the oven body 112. Example materials comprising the first door 124 can comprise, but are not limited to: aluminum, aluminum alloys, steal, iron, iron alloys, brass, brass alloys, ceramic, ceramic composites, stone, glass, plastic, a combination thereof, and/or the like.

FIGS. 11A-D illustrates a diagram of the example, non-limiting second door 126 from multiple perspectives. FIGS. 11A-B illustrate the second door 126 from the first perspective utilized in FIG. 1. FIG. 11C illustrates the second door 126 from the second perspective utilized in FIG. 2. FIG. 11D illustrates the second door 126 from a fifth perspective, wherein the fifth perspective is opposite the third perspective utilized in FIG. 3. Repetitive description of like elements employed in other embodiments described herein is omitted for sake of brevity.

The second door 126 can comprise a second front surface 1102, a second back surface 1104, a third side surface 1106, a fourth side surface 1108, and a second top surface 1110, a second bottom surface 1112. When the second door 126 is positioned in the lift assembly 114, between the first panel 116 and the second panel 118, the second front surface 1102 can face away from the oven body 112. Also, when the second door 126 is positioned in the lift assembly 114, between the first panel 116 and the second panel 118, the second back surface 1104 can face towards the oven body 112.

In various embodiments, the second door 126 can further comprise a connection latch 1114. The connection latch 1114 can comprise a first arm 1116 and a second arm 1118. The first arm 1116 and the second arm 1118 can connect the connection latch 1114 to the second door 126 (e.g., to the second front surface 1102). Also, the connection latch 1114 can comprise a top panel 1120 that connects the first arm 1116 and the second arm 1118. While maintaining its attachment to the second door 126, the connection latch 1114 can move towards and away from the second front surface 1102 as the second door 126 traverses the lift assembly 114.

FIG. 11A shows the connection latch 1114 in position A, wherein the connection latch 1114 has moved towards the second front surface 1102 such that the top panel 1120 is positioned directly above the second top surface 1110. FIG. 11B shows magnified portion of the connection latch 1114 while it is in position B, wherein the connection latch 1114 has moved away from the second front surface 1102.

The top panel 1120 can comprise a plurality of connection tabs. For example, the top panel 1120 can comprise a third connection tab 1122 near the third side surface 1106, and a fourth connection tab 1124 near the fourth side surface 1108. The plurality of connection tabs can be connected to the plurality of drive assemblies via one or more connectors. For example, the third connection tab 1122 can be connected (e.g., via a chain) to the sixth gear 918 of the second drive assembly 122. Further, the fourth connection tab 1124 can be connected (e.g., via a chain) to the eighth gear 922 of the second drive assembly 122.

The third side surface 1106, the fourth side surface 1108, the first arm 1116, and the second arm 1118 can comprise a plurality of guidance projections to guide the movement of the second door 126 along the lift assembly 114. The plurality of guidance projections can extend from the third side surface 1106, the fourth side surface 1108, the first arm 1116, and/or the second arm 1118 away from the second door 126. In various embodiments, the third side surface 1106 can comprise a fifth guidance projection 1128 and a sixth guidance projection 1130. The fourth side surface 1108 can comprise a seventh guidance projection 1132 and an eighth guidance projection 1134. The first arm 1116 can comprise a ninth guidance projection 1136, and the second arm 1118 can comprise a tenth guidance projection 1138. The plurality of guidance projections can be positioned so as to align with the plurality of grooves comprising the first panel 116 and/or the second panel 118. Further, the each guidance projection of the plurality of guidance projections can be shaped so as to fit inside a respective groove of the plurality of grooves.

For example, the fifth guidance projection 1128 can be positioned near the second top surface 1110 and second back surface 1104 so as to align with the seventh groove 514, located in the second panel 118, when the second door 126 is positioned in the lift assembly 114. Similarly, the seventh guidance projection 1132 can be positioned near the second top surface 1110 and the second back surface 1104 so as to align with the third groove 506, located in the first panel 116, when the second door 126 is positioned in the lift assembly 114. The sixth guidance projection 1130 can extend from the third side surface 1106 and be positioned near the second bottom surface 1112 and the second front surface 1102 so as to align with the eighth groove 516, located in the second panel 118, when the second door 126 is positioned in the lift assembly 114. Also, the ninth guidance projection 1136 can extend from the first arm 1116 and be positioned so as to align with the eighth groove 516, located in the second panel 118, when the second door 126 is positioned in the lift assembly 114. Similarly, the eighth guidance projection 1134 can be positioned near the second bottom surface 1112 and the second front surface 1102 so as to align with the fourth groove 508, located in the first panel 116, when the second door 126 is position in the lift assembly 114. Also, the tenth guidance projection 1138 can extend from the second arm 1118 so as to align with the fourth groove 508, located in the second panel 118, when the second door 126 is positioned in the lift assembly 114.

The dimensions of the second door 126 can vary depending on the number of doors comprising the plurality of doors and/or the size of the hole in the front side 108. For example, the height of the second door 126 can range from, but not limited to, greater than or equal 10 inches and less than or equal to 10 feet. The width of the second door 126 can range from, but not limited to, greater than or equal 10 inches and less than or equal to 10 feet. The depth of the second door 126 can range from, but not limited to, greater than or equal 0.5 inches and less than or equal 36 inches. The weight of the second door 126 can range from, but not limited to, greater than or equal to 10 pounds and less than or equal to 2,000 pounds. In some embodiments, the second door 126 can be made from the same materials as the oven body 112. In one or more embodiments, the second door 126 can be made from different materials than the oven body 112. Example materials comprising the second door 126 can comprise, but are not limited to: aluminum, aluminum alloys, steal, iron, iron alloys, brass, brass alloys, ceramic, ceramic composites, stone, glass, plastic, a combination thereof, and/or the like.

In various embodiments, the first drive assembly 120 can lift and/or lower the first door 124 along the lift assembly 114 to achieve open and/or closed states. The first groove 502, the second groove 504, the fifth groove 510, and the sixth groove 512 can guide the path of the first door 124 as it traverses the lift assembly 114 via interaction with the first guidance projection 1018, second guidance projection 1020, third guidance projection 1022, and fourth guidance projection 1024. In one or more embodiments, the first door 124 can remain in a first vertical plane, moving up and down.

In various embodiments, the second drive assembly 122 can lift and/or lower the second door 126 along the lift assembly 114 to achieve open and/or closed states. The third groove 506, fourth groove 508, seventh groove 514, and eighth groove 516 can guide the path of the second door 126 as it traverses the lift assembly 114 via interaction with the fifth guidance projection 1128, sixth guidance projection 1130, seventh guidance projection 1132, eighth guidance projection 1134, ninth guidance projection 1136, and tenth guidance projection 1138.

In one or more embodiments, as the second drive assembly 122 lifts the second door 126 from a closed position (e.g., the third position described herein above and shown in FIG. 1) the third groove 506, fourth groove 508, seventh groove 514, and eighth groove 516 can transition the second door 126 from the first vertical plane, which the first door 124 is located, to a second vertical plane located further from the oven body 112 than the first vertical plane. By transitioning the second door 126 to the second vertical plane, the lift assembly 114 can guide the second door 126 around the first door 124 no matter the first door's 124 position. For example, when the second door 126 is in a closed state located under the first door 124 (e.g., the third position described herein above and shown in FIG. 1) the connection latch 1114 can be in position B (e.g. shown in FIG. 11B) with the ninth guidance projection 1136 and the tenth guidance projection 1138 remaining in the portion of the fourth groove 508 and the eighth groove 516 that has not yet turned towards the oven body 112. Thus, the ninth guidance projection 1136 and the tenth guidance projection 1138 constantly remain the second vertical plane, thereby keeping the third connection tab 1122 and the fourth connection tab 1124 aligned with the second drive assembly 122 despite the second door's 126 transition between vertical planes. As the second door 126 is lifted from the closed state (e.g., the third position described herein above and shown in FIG. 1), the third groove 506, fourth groove 508, seventh groove 514, and eighth groove 516 lead the fifth guidance projection 1128, sixth guidance projection 1130, seventh guidance projection 1132, and eighth guidance projection 1134 away from the oven body 112, off the first vertical plane, and onto the second vertical plane whereon the fourth groove 508 and the eighth groove 516 lead the second door 126 up towards the second drive assembly 122. Also, as the second door 126 moves from the first vertical plane to the second vertical plane, the connection latch 1114 transitions to position A (e.g., shown in FIG. 11A).

In one or more embodiments, the oven 100 can comprise more than two doors. For example, the plurality of doors managed by the lift assembly 114 can comprise three or more doors. A third door can be positioned below the second door 126 when the oven 100 is in a closed state. Also, the third door can have equivalent features to those comprising the second door 126. As the third door moves between an open state and a close state, the lift assembly 114 can guide the third door (and any other additional doors) around the second door 126 and the first door 124 similar to how the second door 126 is guided around the first door 124.

Figure 12:
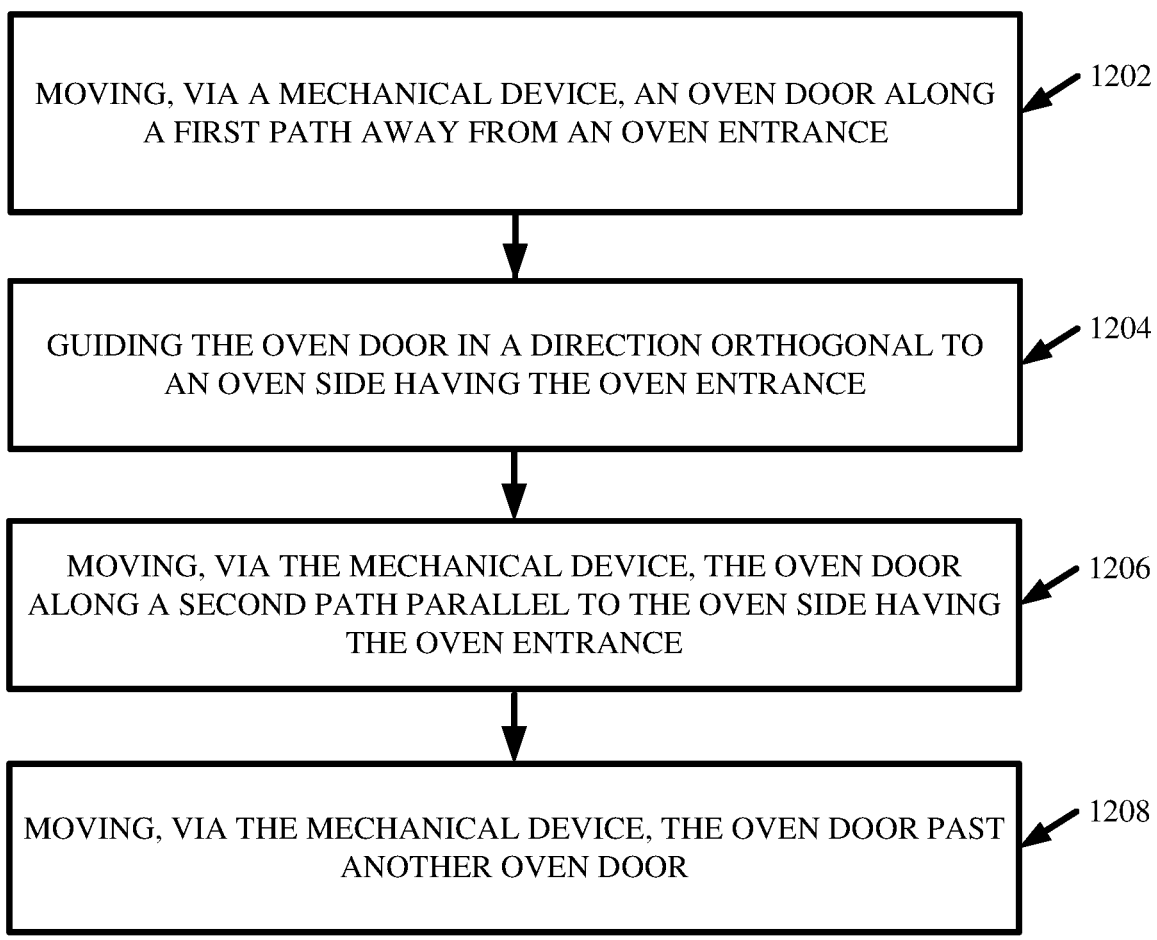
FIG. 12 illustrates a flow diagram of an example, non-limiting method for operating an oven with split oven doors in accordance with one or more embodiments described herein.

FIG. 12 illustrates a flow chart of an example, non-limiting method 1200 for operating one or more doors comprising the oven 100. Repetitive description of like elements employed in other embodiments described herein is omitted for sake of brevity. At 1202 the method can comprise, moving, via a mechanical device (e.g., first motor 902 and/or second motor 914) a door (e.g., the second door 126) along a first path away from an entrance (e.g., a hole in the front side 108) to the oven 100 (e.g., via the second drive assembly 122). At 1204 the method 1200 can further comprise guiding the door (e.g., the second door 126) in a direction orthogonal to the oven side (e.g., the front side 108) having the oven entrance (e.g., via the third groove 506, the fourth groove 508, the seventh groove 514, and the eighth groove 516). The door (e.g., the second door 126) can be moved in the orthogonal direction for a distance at least greater than the width of another door (e.g., the first door 124) comprising the oven 100.

At 1206 the method 1200 can then comprise moving the door (e.g., the second door 126) along a second path parallel to the oven side (e.g., the front side 108) having the oven entrance (e.g., via the third groove 506, the fourth groove 508, the seventh groove 514, and the eighth groove 516). The door (e.g., the second door 126) can be moved in the parallel direction until the door no longer covers the oven entrance. At 1208 the method 1200 can further comprise moving the door (e.g., the second door 126) past the other door (e.g., the first door 124). In various embodiments, moving the door (e.g., the second door 126) along the second path can comprise lifting the door above the oven entrance. The method 1200 can facilitate moving the door (e.g., the second door 126) from the third position, described herein and shown in FIG. 1, to the fourth position, described herein and shown in FIG. 2.

In various embodiments, the method 1200 can also comprise moving the other door (e.g., the first door 124) along a third path (e.g., defined by the first groove 502, the second groove 504, the fifth groove 510, and the sixth groove 512). The third path can also be parallel to the oven side having the oven entrance. The method 1200 can facilitate moving the other door (e.g., the first door 124) from the first position, described herein and shown in FIG. 1, to the second position, described herein and shown in FIG. 2. Further, the method 1200 can comprise moving the door and/or the other door in any direction along the first path, the second path, and/or the third path. For example, the method 1200 can comprise moving the door (e.g., the second door 126) in a first direction down an operating frame (e.g., lift assembly 114) and in a second direction towards an oven (e.g., oven body 112); and the method 1200 can comprise moving the door (e.g., the second door 126) in a third direction away from the oven (e.g., the oven body 112) and up the an operating frame (e.g., lift assembly 114). Similarly, the method 1200 can comprise moving the other door (e.g., the first door 124) in the first direction, and the method 1200 can comprise moving the other door (e.g., the first door 124) in the fourth direction.

The method 1200 can comprise move the door (e.g., the second door 126) and/or the other door (e.g., the first door 124) to various positions along an operating frame (e.g., lift assembly 114) in order to achieve open and/or closed oven states. Since, the method 1200 can comprise moving multiple doors that cover an oven entrance, as oppose to a single large door, each door can be moved more quickly than conventional oven door operating techniques. In various embodiments, the method 1200 can comprise moving one or more doors from a first position (e.g., a position facilitating a closed state) to a second position (e.g., a position facilitating an open state) in no more than a few seconds. For example, the method 1200 can move the one or more doors between various positions in greater than or equal to 0.25 seconds and less than or equal to 5 seconds. The speed at which the method 1200 can move the one or more doors depends on the number of doors, the size of the doors, and/or the strength of one or more motors driving the movement.

The flowchart and block diagrams in the Figures illustrate the architecture, functionality, and operation of possible implementations of methods according to various embodiments of the present invention. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware that perform the specified functions or acts or carry out combinations of special purpose hardware.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What has been described above include mere examples of apparatuses and methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   moving, by a mechanical device, a first oven door along a first path in a first direction orthogonal to a side surface of an oven, the side surface comprising an entrance to the oven; and
   moving, by the mechanical device, the first oven door along a second path in a second direction parallel to the side surface, wherein moving the first oven door along the second path comprises moving the first oven door past a second oven door.

2. The method of claim 1, wherein moving the first oven door along the first path and the second path comprises moving the first oven door from a first position adjacent to an end of the second oven door to a second position adjacent to a side of the second oven door.

3. The method of claim 2, wherein moving the first oven door from the first position to the second position takes equal to or less than two seconds.

4. The method of claim 1, wherein the mechanical device comprises:
   a first panel comprising a first plurality of grooves that traverse a first inside surface of the first panel;
   a second panel comprising a second plurality of grooves that traverse a second inside surface of the second panel, wherein the first inside surface faces the second inside surface, and wherein and the first plurality of grooves and the second plurality of grooves define the first path and the second path.

5. The method of claim 4, wherein the mechanical device further comprises a motor connected to the first oven door.

6. The method of claim 4, wherein the first plurality of grooves and the second plurality of groves extend in the first direction along a length of the first inside surface and then turn to extend in the second direction towards an interior hollow space of the oven.

7. The method of claim 4, wherein the first oven door is positioned between the first inside surface and the second inside surface, wherein the first oven door comprises first projections that extend from the first oven door into a first subset of the first plurality of grooves and a second subset of the second plurality of grooves, and wherein the first plurality of grooves and the second plurality of grooves extend in the first direction and then turn to extend in the second direction.

8. The method of claim 7, wherein moving the first oven door along the first path and moving the first oven door along the second path comprises moving the first oven door via the first projections.

9. The method of claim 7, wherein the second oven door is positioned between the first inside surface and the second inside surface, the second oven door comprising second projections that extend from the second oven door into a third subset of the first plurality of grooves and a fourth subset of the second plurality of grooves.

10. The method of claim 9, further comprising:
    moving, via the mechanical device and the second projections, the second oven door in the first direction; and
    moving, via the mechanical device and the second projections, the second over door in the second direction.

11. The method of claim 10, wherein moving the second over door in the first direction comprises moving the second oven door along a third path in the first direction orthogonal to the side surface of the oven, and wherein moving the second oven door in the second direction comprises moving the second oven door along a fourth path in the second direction parallel to the side surface.

12. A method, comprising:
    moving, by a mechanical device, a first oven door along a first path in a first direction orthogonal to a side surface of an oven, the side surface comprising an entrance to the oven;
    moving, by the mechanical device, the first oven door along a second path in a second direction parallel to the side surface;
    moving, by the mechanical device, a second oven door along a third path in the first direction; and
    moving, by the mechanical device, the second oven door along a fourth second path in the second direction.

13. The method of claim 12, wherein moving the first oven door along the second path comprises moving the first oven door past the second oven door.

14. The method of claim 12, wherein moving the first oven door along the first path and the second path comprises moving the first oven door from a first position adjacent to an end of the second oven door to a second position adjacent to a side of the second oven door.

15. The method of claim 12, wherein the mechanical device comprises:
- a first panel comprising a first plurality of grooves that traverse a first inside surface of the first panel;
- a second panel comprising a second plurality of grooves that traverse a second inside surface of the second panel, wherein the first inside surface faces the second inside surface, and wherein and the first plurality of grooves and the second plurality of grooves define the first path and the second path,
  - wherein the first plurality of grooves and the second plurality of groves extend in the first direction along a length of the first inside surface and then turn to extend in the second direction towards an interior hollow space of the oven.

16. The method of claim 15, wherein the mechanical device further comprises a first motor connected to the first oven door and a second motor connected to the second oven door.

17. The method of claim 15,
- wherein the first oven door is positioned between the first inside surface and the second inside surface, wherein the first oven door comprises first projections that extend from the first oven door into a first subset of the first plurality of grooves and a second subset of the second plurality of grooves, and wherein the first plurality of grooves and the second plurality of grooves extend in the first direction and then turn to extend in the second direction,
- wherein moving the first oven door along the first path and the second path comprises moving the first oven door via the first projections;
- wherein the second oven door is positioned between the first inside surface and the second inside surface, the second oven door comprising second projections that extend from the second oven door into a third subset of the first plurality of grooves and a fourth subset of the second plurality of grooves, and
- wherein moving the second oven door along the third path and the fourth path comprises moving the second oven door via the second projections.

18. A method, comprising:
- moving, via a motor, a first oven door along a first path in a first direction orthogonal to a side surface of an oven, the side surface comprising an entrance to the oven;
- moving, via the first motor, the first oven door along a second path in a second direction parallel to the side surface;
- moving, via a second motor, a second oven door along a third path in the first direction; and
- moving, via the second motor, the second oven door along a fourth second path in the second direction.

19. The method of claim 18, wherein moving the first oven door along the second path comprises moving the first oven door past the second oven door.

20. The method of claim 19, wherein moving the first oven door along the first path and the second path comprises moving the first oven door from a first position adjacent to an end of the second oven door to a second position adjacent to a side of the second oven door.

* * * * *